US010063792B1

(12) United States Patent
Brailovskiy et al.

(10) Patent No.: US 10,063,792 B1
(45) Date of Patent: Aug. 28, 2018

(54) FORMATTING STITCHED PANORAMIC FRAMES FOR TRANSMISSION

(71) Applicant: Amazon Technologies, Inc., Seattle, WA (US)

(72) Inventors: Ilya Vladimirovich Brailovskiy, Mountain View, CA (US); Ilia Vitsnudel, Yehuda (IL); Philip James Taylor, Cambridge (GB); Nathaniel Bubis, Tel Aviv (IL); Matthew Alan Townsend, Redwood City, CA (US); Dmitry Svetlov, Santa Clara, CA (US); Noam Sorek, Zichron Yaccov (IL); Benjamin Robert Hirsch, San Francisco, CA (US); Paul Andersen Alioshin, Palo Alto, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 343 days.

(21) Appl. No.: 14/870,935

(22) Filed: Sep. 30, 2015

(51) Int. Cl.
*H04N 5/00* (2011.01)
*G02B 13/00* (2006.01)
*H04N 5/262* (2006.01)
*H04N 5/232* (2006.01)
*H04N 5/225* (2006.01)
*H04N 7/18* (2006.01)

(52) U.S. Cl.
CPC ......... *H04N 5/2628* (2013.01); *H04N 5/2259* (2013.01); *H04N 5/23238* (2013.01); *H04N 7/181* (2013.01)

(58) Field of Classification Search
CPC ......... H04N 5/2628; H04N 7/18; H04N 5/262

USPC .......................................... 348/36
See application file for complete search history.

(56) References Cited

U.S. PATENT DOCUMENTS

2012/0169842 A1* 7/2012 Chuang ............ G08B 13/19619
348/39

OTHER PUBLICATIONS

Wiegand, T, Sullivan, G. J., Gjontegaard, G. And Luthra, A. (2003). Overview of the H.264/AVC Video Coding Standard. IEEE Transactions on Circuit and Systems for Video Technology, (Jul. 7, 2003), vol. 13, No. 7, 560-576).*
Author Unknown, "3D Tile Format and 3DZ Tile Format Implementation notes," Sisvel Technology, Available at: http://www.sisveltechnology.com/files/2013/3dtv/3D-3DZ-Tile-Format-implementation-notes.pdf, 10 pages, (2013).

(Continued)

*Primary Examiner* — Sathyanaraya V Perungavoor
*Assistant Examiner* — Patricia I Young
(74) *Attorney, Agent, or Firm* — K&L Gates LLP

(57) ABSTRACT

Various examples are directed to systems and methods for formatting stitched panoramic frames for transmission to a remote image processing system, the method comprising. A control circuit of a panoramic camera may receive first and second frames captured by first and second image sensors having partially overlapping fields-of-view. The control circuit may identify a first overlap region of the first frame and a second overlap region of the second frame. The first and second overlap region may comprise pixel values from portions of the fields-of-view of the image sensors that overlap. The control circuit may generate a panoramic frame from based at least in part on the first and second frames. The control circuit may generate a transmission frame comprising the panoramic frame, the first overlap region and the second overlap region.

20 Claims, 13 Drawing Sheets

(56) References Cited

OTHER PUBLICATIONS

Author Unknown, "Cropping Rectangle," Sisvel Technology, Available at: http://www.sisveltechnology.com/files/2013/3dtv/Cropping-rectangle-EN.pdf, 4 pages, (2013).
Grois et al., "Recent Advances in Region-of-interest Video Coding," Recent Advances on Video Coding, Dr. Javier Del Ser Lorente (Ed.), InTech Available at: http://www.intechopen.com/books/recent-advances-on-video-coding/recent-advances-in-region-of-interestvideo-coding, 29 pages, (2011).

* cited by examiner

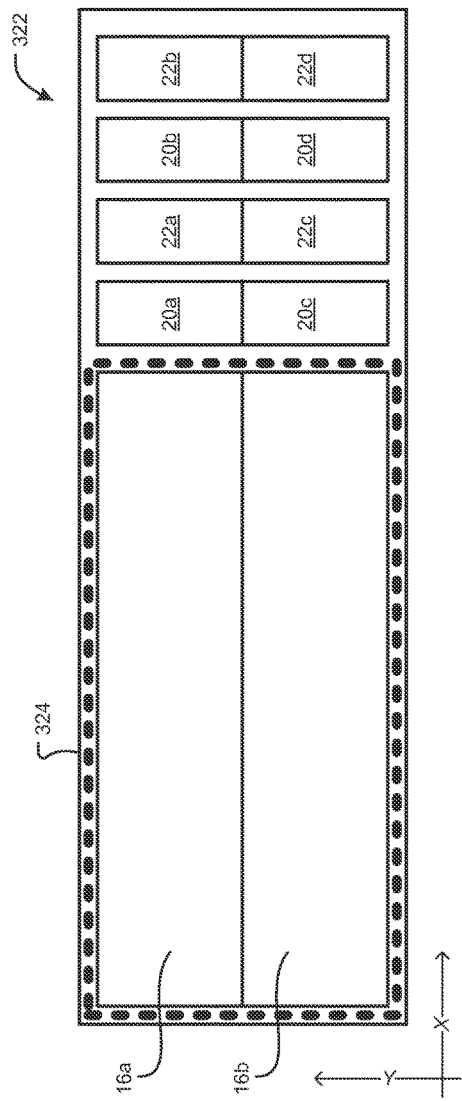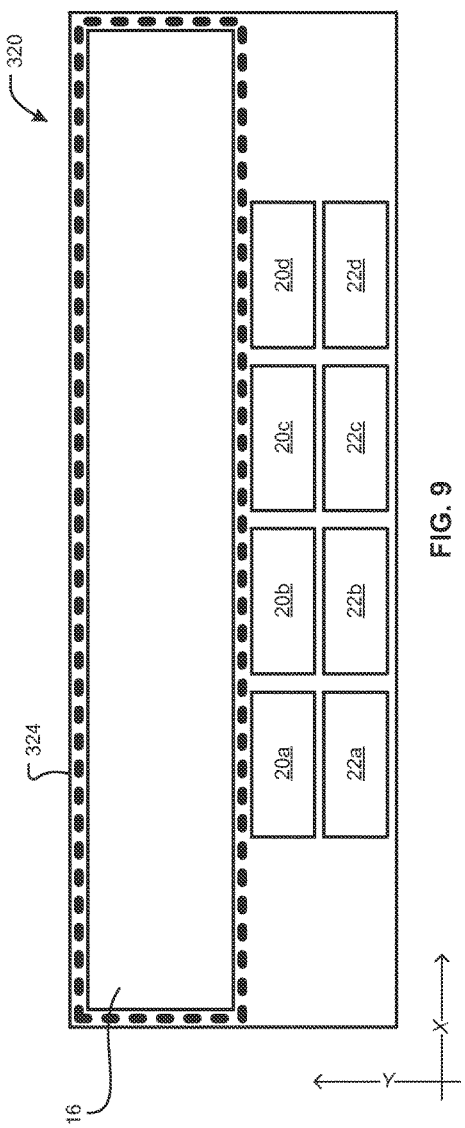
FIG. 10
FIG. 9

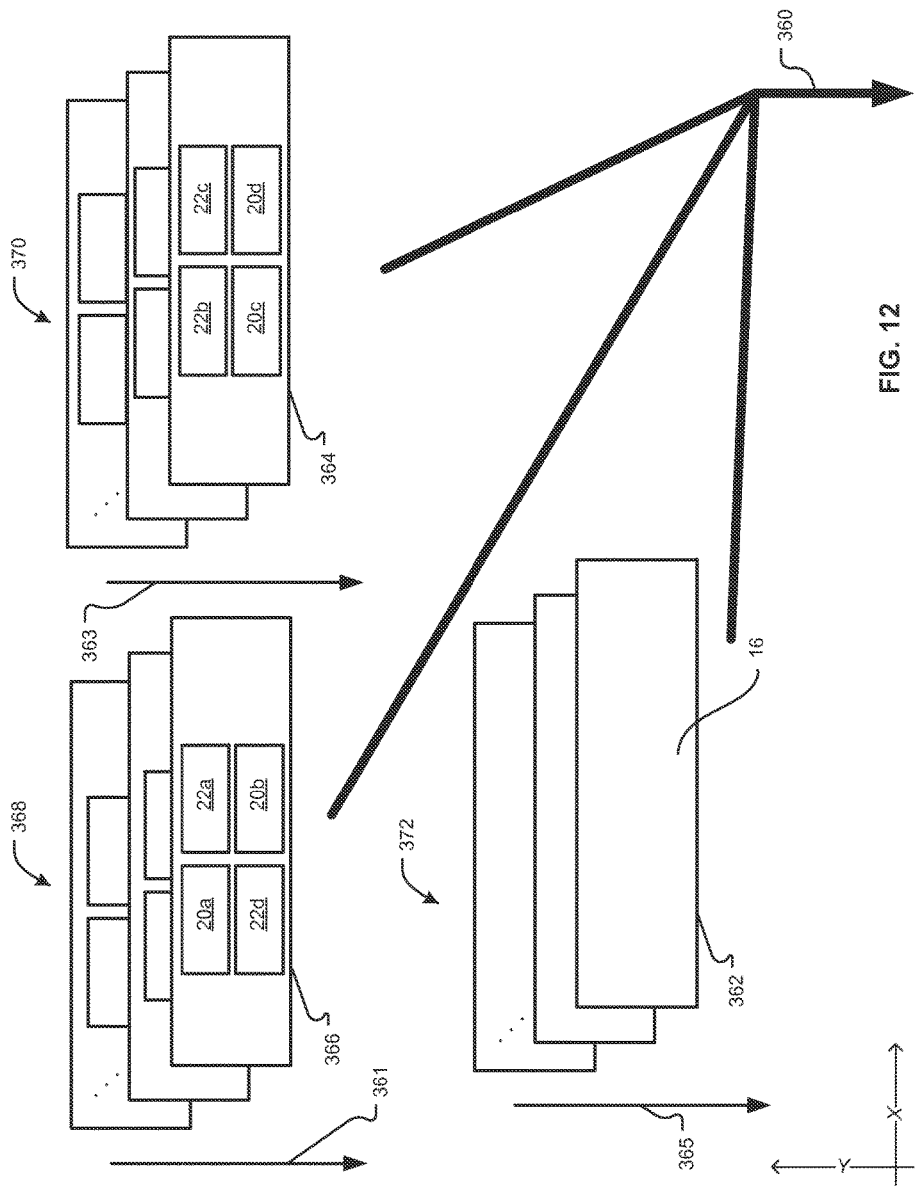

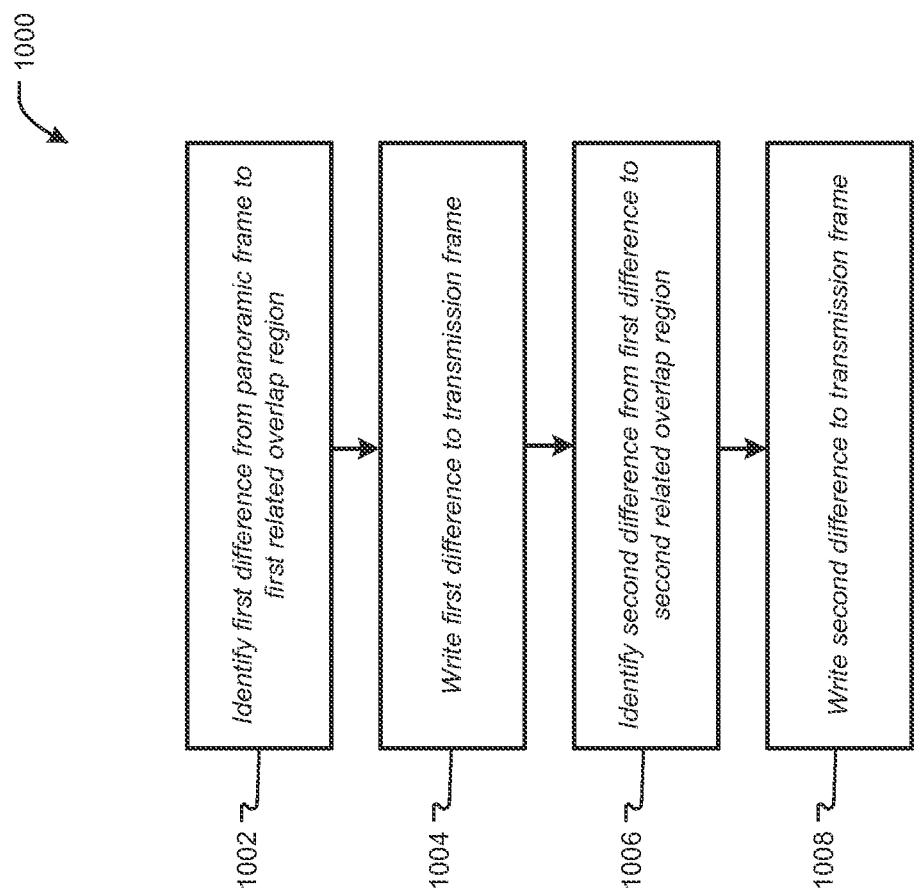

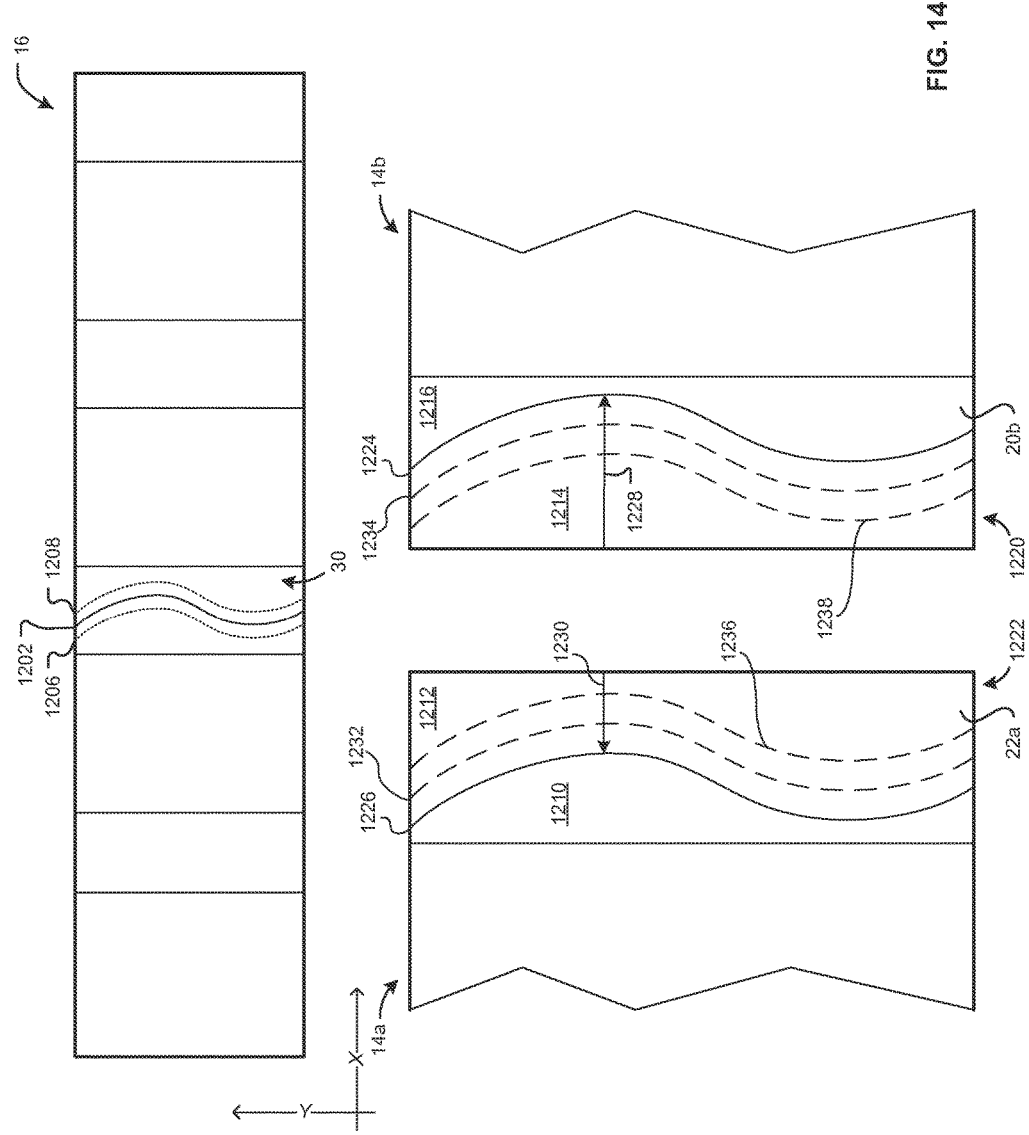

FORMATTING STITCHED PANORAMIC FRAMES FOR TRANSMISSION

BACKGROUND

Some panoramic cameras include multiple image sensors with overlapping fields-of-view. Such panoramic cameras form panoramic frames by stitching or otherwise joining frames captured by the individual image sensors.

BRIEF DESCRIPTION OF DRAWINGS

FIG. 9 is a diagram showing one example of a transmission frame that may be generated by the control circuit of a panoramic camera.

FIG. 10 is a diagram showing one example of a transmission frame in which the panoramic frame is divided into two panoramic frame sections.

FIG. 12 is a diagram showing another transmission frame sequence.

FIG. 13 is a flowchart showing one example of a process flow for compressing a panoramic frame and overlap areas by taking pixel value differences.

FIG. 14 is a diagram showing one example of the panoramic frame and image sensor frames.

DETAILED DESCRIPTION

In the following description, reference is made to the accompanying drawings, which illustrate several examples of the present invention. It is understood that other examples may be utilized and various operational changes may be made without departing from the spirit and scope of the present disclosure. The following detailed description is not to be taken in a limiting sense, and the scope of the embodiments of the present invention is defined only by the claims of the issued patent.

Various examples described herein are directed to systems and methods for formatting panoramic frames for transmission to a remote image processing system. For example, a panoramic camera may comprise multiple image sensors, with some image sensors having partially overlapping fields-of-view. Each image sensor may capture an image sensor frame. Because at least some of the image sensor fields-of-view partially overlap, at least some of the image sensor frames include overlap regions that depict a portion of the captured scene that is also depicted by another image sensor frame captured by an adjacent image sensor. A control circuit of the panoramic camera may stitch the image sensor frames into a panoramic frame. To enable more advanced processing of the image sensor frames and panoramic frame, the control circuit may generate one or more transmission frames that include the panoramic frame and the overlap regions.

In some examples, the control circuit may generate a transmission frame that includes the panoramic frame and the overlap regions. For example, the transmission frame may include cropping data describing the portion of the transmission frame that includes the panoramic frame. In this way a computing device receiving the transmission frame may simply playback the panoramic frame. A remote image processing system, however, may be programmed to extract the overlap regions from the transmission frame. In some examples, the control circuit may incorporate the panoramic frame and overlap region into two or more transmission frames that may be incorporated into a transmission sequence.

Figure 1:
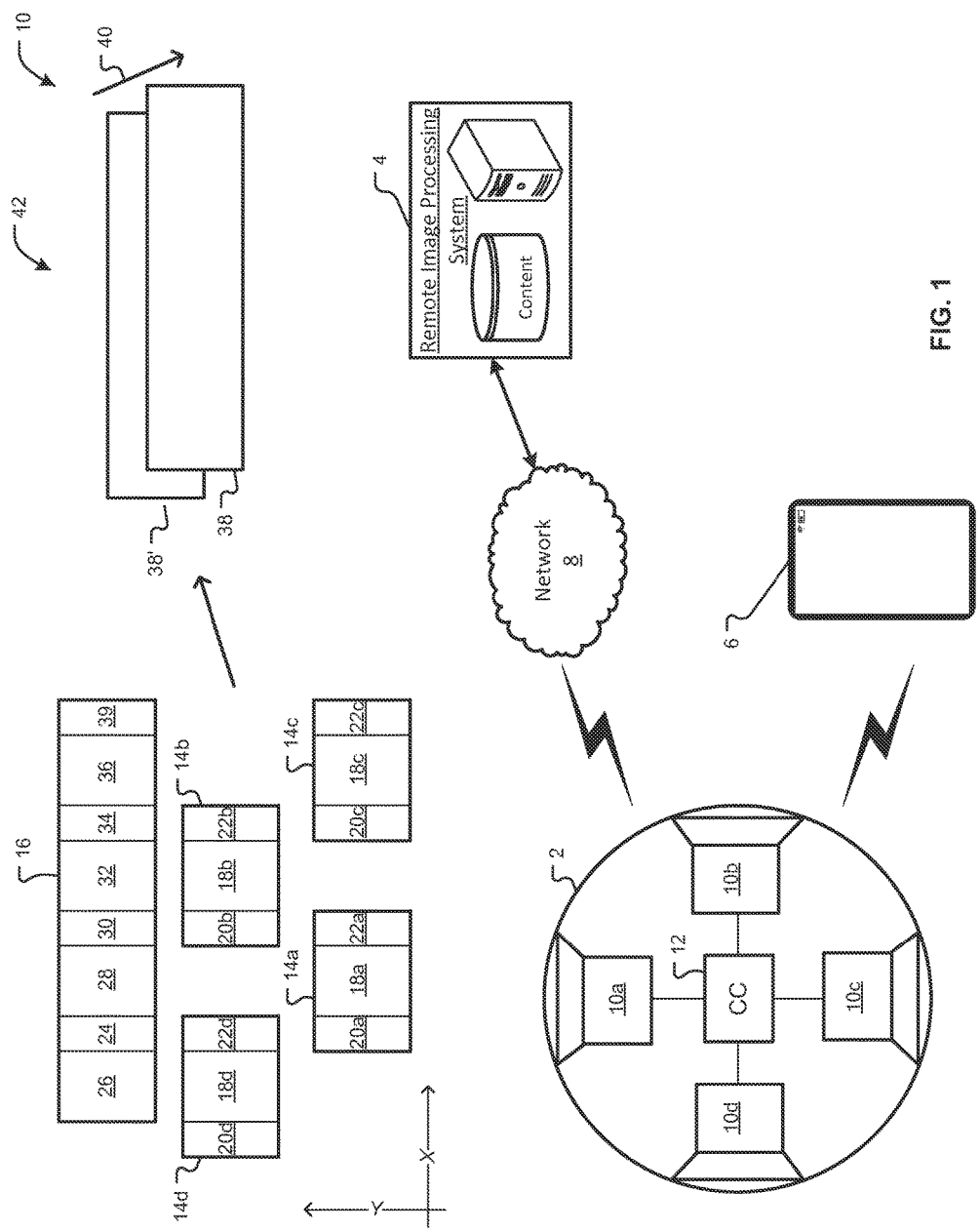
FIG. 1 is a diagram showing one example of an environment for formatting panoramic frames for transmission to a remote image processing system.

FIG. 1 is a diagram showing one example of an environment 10 for formatting panoramic frames for transmission to a remote image processing system 4. The environment 10 comprises a panoramic camera 2. The panoramic camera comprises image sensors 10a, 10b, 10c, 10d and a control circuit 12. Although four image sensors 10a, 10b, 10c, 10d are shown, any suitable number of image sensors may be used. Image sensors 10a, 10b, 10c, 10d may capture image sensor frames 14a, 14b, 14c, 14d depicting portions of a scene around the panoramic camera 2 that are within their respective fields-of-view. Adjacent image sensors 10a, 10b, 10c, 10d may have partially overlapping fields-of-view. For example, the field-of-view of image sensor 10a may partially overlap the fields-of-view of image sensors 10b and 10d. The field-of-view of image sensor 10b may partially overlap the fields-of-view of image sensors 10a and 10c. The field-of-view of image sensor 10c may partially overlap the fields-of-view of image sensors 10b and 10d. The field-of-view of image sensor 10d may partially overlap the fields-of-view of image sensors 10a and 10c. Additional details of overlapping fields-of-view in the panoramic camera 2 are described herein, for example, with respect to FIGS. 2 and 5.

The control circuit 12 may receive image sensor frames 14a, 14b, 14c, 14d from the image sensors 10a, 10b, 10c, 10d and stitch the image sensor frames 14a, 14b, 14c, 14d into a panoramic frame 16 showing the scene around the panoramic camera 2. Image sensor frames 14a, 14b, 14c, 14d may comprise two-dimensional spatial arrangements of pixel values representing the captured scene. For example, each pixel value of an image sensor frame 14a, 14b, 14c, 14d may have a pixel position, for example, described by an X dimension value and a Y dimension value. The panoramic frame 16 may also comprise a two-dimensional spatial arrangement of pixel values either copied or derived from the respective image sensor frames 14a, 14b, 14c, 14d during stitching. The panoramic frame 16 may be a stand alone image and/or may be part of a panoramic video. For example, multiple panoramic frames, such as panoramic frame 16, may be captured in time and stored according to a temporal sequence.

In some examples, it may be desirable to modify and/or enhance the panoramic frame 16 at the remote image processing system 4. For example, the remote image processing system 4 may have hardware resources that are impractical to include at control circuit 12 of the panoramic camera 2. This may allow the remote image processing system 4 to perform advanced stitching and/or error correction algorithms that the control circuit 12 either cannot perform at all, or cannot perform at a desired speed. Modification or enhancement of the panoramic frame 16 at the remote image processing system may be in addition to or instead of processing at the panoramic camera 2. To allow the remote image processing system 4 to process the panoramic frame 16, it is, in some examples, desirable to provide the remote image processing system with both the panoramic frame 16 and the individual image sensor frames 14a, 14b, 14c, 14d that were stitched together to generate the panoramic frame. This may allow the remote image processing system 4 to perform various actions on the frames including, for example, enhancing the panoramic frame 16, re-stitching the panoramic frame 16 from its constituent image sensor frames 14a, 14b, 14c, 14d, extracting regions-of-interest from the panoramic frame 16, etc. Simply sending the image sensor frames 14a, 14b, 14c, 14d to the remote image processing system 4 along with the panoramic frame 16, however, more than doubles the total data being transmitted. Also, sending the image sensor frames 14a, 14b, 14c, 14d along (i.e., without the panoramic frame 16) may prevent the remote image processing system 4 from enhancing stitching already performed at the panoramic camera 2.

In various examples, the panoramic camera 2 (e.g., the control circuit 12 thereof) may be programmed to format the panoramic frame 16 along with overlap regions 20a, 22a, 20b, 22b, 20c, 22c, 20d, 22d of the image sensor frames 14a, 14b, 14c, 14d for transmission to the remote processing system 4. Overlap regions 20a, 22a, 20b, 22b, 20c, 22c, 20d, 22d may be regions (e.g., sets of contiguous pixel positions) in the image sensor frames 14a, 14b, 14c, 14d that are not directly reproduced in the panoramic frame 16. Accordingly, a combination of the panoramic frame 16 and the overlap regions 20a, 22a, 20b, 22b, 20c, 22c, 20d, 22d may enable the remote image processing system 4 to reproduce the original image sensor frames 14a, 14b, 14c, 14d and/or perform other processing on the panoramic frame 16.

The control circuit 12 may be programmed to format the panoramic frame 16 and overlap regions 20a, 22a, 20b, 22b, 20c, 22c, 20d, 22d for transmission in any suitable manner. For example, the control circuit 12 may generate one or more transmission frames 38. In some examples, a single transmission frame 38 may comprise the pixel values of the panoramic frame 16 and the pixel values of one or more of the overlap regions 20a, 22a, 20b, 22b, 20c, 22c, 20d, 22d. In some examples, the relative pixel positions of pixel values from the panoramic frame 16 and overlap regions 20a, 22a, 20b, 22b, 20c, 22c, 20d, 22d may be maintained at the transmission frame 38. In some examples, the panoramic frame 16, and/or one or more of the overlap regions 20a, 22a, 20b, 22b, 20c, 22c, 20d, 22d may be scaled before being incorporated into the transmission frame. The transmission frame 38 may be sent to the remote image processing system 4 either as a stand-alone panoramic image and/or as part of a sequence 40 of frames. For example, when the panoramic frame 16 is incorporated into a panoramic video, the sequence 40 of frames may correspond to a temporal frame sequence of the video.

In some examples, the panoramic frame 16 and associated overlap regions 20a, 22a, 20b, 22b, 20c, 22c, 20d, 22d may be incorporated into multiple transmission frames. For example, the transmission frame 38 may include some or all of the overlap regions 20a, 22a, 20b, 22b, 20c, 22c, 20d, 22d and exclude the panoramic frame 16. An additional transmission frame 38' may include the panoramic frame 16. The control circuit 12 may incorporate both transmission frames 38, 38' into the frame sequence 40 in any suitable order, for example, as described herein. In some examples, the control circuit 12 may also be programmed to provide the image frame 16 and/or the frame sequence 40 to a user device 6 via the network 8 and/or via a short range interface (described herein). The user device 6 may act as a remote image processing system and/or may be programmed to display the panoramic frame 16 and/or playback a video including the panoramic frame 16.

As described herein, overlap regions 20a, 22a, 20b, 22b, 20c, 22c, 20d, 22d may be regions or sets of contiguous pixel positions from the image sensor frames 14a, 14b, 14c, 14d that are not directly reproduced in the panoramic frame 16. For example, the fields-of-view of adjacent image sensors 10a, 10b, 10c, 10d may partially overlap. Each image sensor frame 14a, 14b, 14c, 14d may include one or more exclusive regions 18a, 18b, 18c, 18d and the one or more overlap regions 20a, 22a, 20b, 22b, 20c, 22c, 20d, 22d. Exclusive regions 18a, 18b, 18c, 18d of an image sensor frame 14a, 14b, 14c, 14d may include pixel values representing a portion of the captured scene represented only in the corresponding image sensor frame 14a, 14b, 14c, 14d. Overlap regions 20a, 22a, 20b, 22b, 20c, 22c, 20d, 22d, on the other hand, may include pixel values representing a portion of the captured scene that is also depicted by another image sensor frame 14a, 14b, 14c, 14d captured by an adjacent image sensor.

Figure 2:
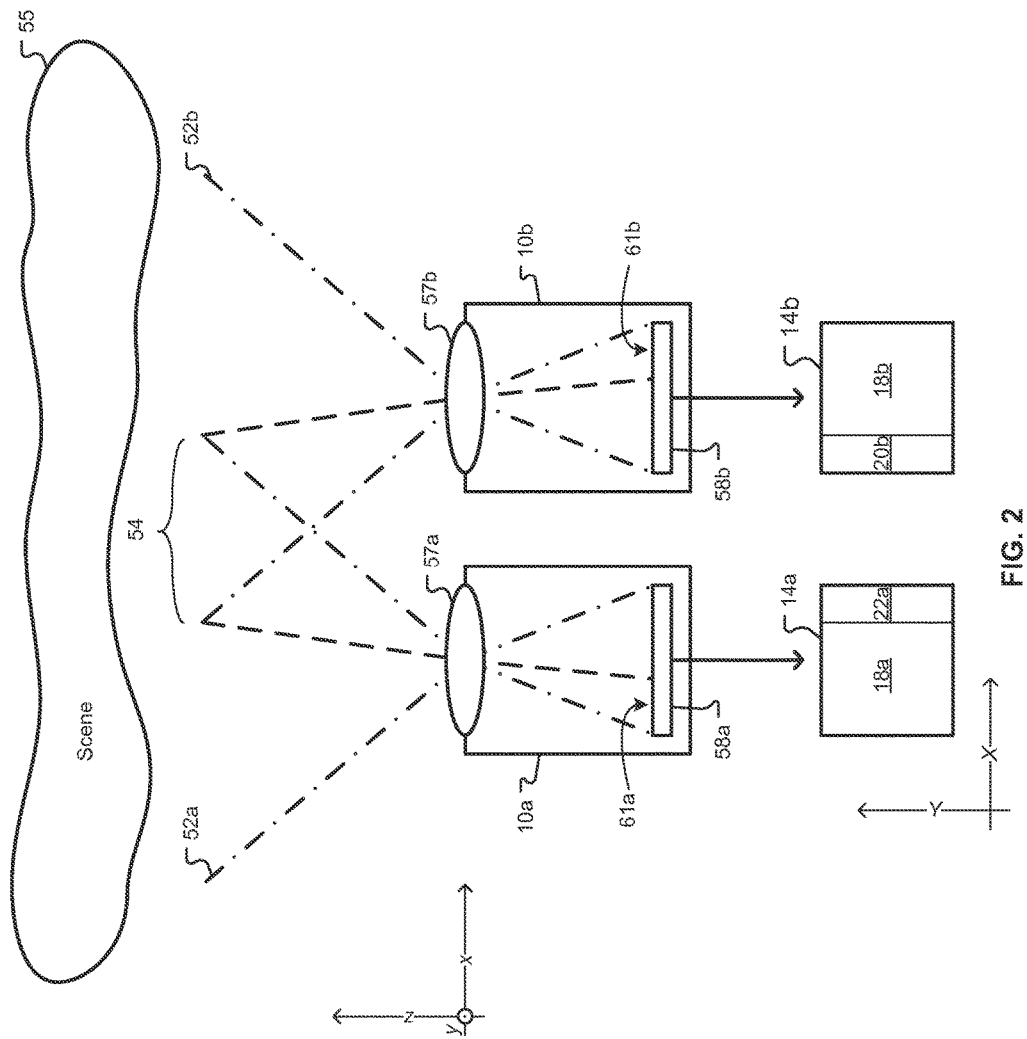
FIG. 2 is a diagram showing an alternate configuration of image sensors that illustrates example overlap regions from image sensor frames.

FIG. 2 is a diagram showing an alternate configuration of image sensors 10a and 10b that illustrates example overlap regions 22a, 20b from image sensor frames 14a, 14b. The environment 50 includes image sensors 10a and 10b, although it will be appreciated that the principles shown and described apply equally to any pair of image sensors having partially overlapping fields of view, including image sensors selected from 10a, 10b, 10c, 10d. As shown in FIG. 2, the image sensors 10a, 10b have respective fields-of-view 52a, 52b directed towards a three-dimensional scene 55 described by dimensions x, y and z. The image sensors 10a, 10b may comprise respective lens assemblies 57a, 57b that focus light originating from or reflected by the scene 55 onto respective image sensor elements 58a, 58b. Lens assemblies 57a, 57b may include any suitable optical element or elements including, for example, any type of lens, any type of filter, etc. Also, in various examples, the image sensors 10a, 10b (including lens assemblies 57a, 57b and image sensor elements 58a, 58b) may be sensitive to any suitable wavelength of light including, for example, infrared light, visible light, ultraviolet light, etc.

The fields-of-view 52a, 52b of the image sensors 10a, 10b may represent a portion of the scene 55 focused on the respective image sensor elements 58a, 58b by the respective lens assemblies 57a, 57b. Each image sensor element 58a, 58b may comprise a two-dimensional array of pixels (not shown). Each pixel may generate a signal (e.g., a pixel value) when light is incident on the pixel. For example, the image sensor frame 14a may comprise pixel values captured from the pixels of the image sensor elements 58a and the image sensor frame 14b may comprise pixel values captured from the pixels of the image sensor elements 58b. The two-dimensional spatial arrangement of the image sensor frames 14a, 14b, in some examples, may correspond to the spatial arrangement of the pixels of the sensor elements 58a, 58b that captured the pixel values. For example, a pixel value from a particular pixel of the image sensor element 58a may have a position in the spatial arrangement of the image sensor frame 14a corresponding to a position of the capturing pixel in the image sensor element 58a.

A common region 54 of the scene 55 may indicate a portion of the scene 55 that is within the field-of-view 52a of the image sensor 10a and within the field-of-view 52b of the image sensor 10b and is, therefore, visible to both the image sensors 10a, 10b. For example, at the image sensor 10a, lens assembly 57a may focus light incident from the common region 54 onto a set of pixels 61a of the image sensor element 58a. At the image sensor 10b, lens assembly 57b may focus light incident from the common region 54 onto a set of pixels 61b of the image sensor element 58b. Accordingly, pixel values generated by the set of pixels 61a may make up the overlap region 22a while pixel values generated by the set of pixels 61b may make up the overlap region 20b. Although light from the same region 54 of the scene 55 is incident on both of the pixel sets 61a, 61b, pixel values from the pixel sets 61a, 61b may not be identical, for example, because the image sensor elements 58a, 58b are at different positions relative to the field-of-view overlap. The remainder of the respective sensor elements 58a, 58b may captured pixel values making up the exclusive regions 18a, 18b. For example, light focused onto the remainder pixels of the sensor element 58a may depict portions of the scene 55 that are not be visible to the other sensor element 58b. Similarly, light focused onto the remainder pixels of the sensor element 58b may depict portions of the scene 55 that are not visible to the sensor element 58a.

Referring back to FIG. 1, in some examples, the control circuit 12 may stitch the panoramic frame 16 by reproducing pixel values from exclusive regions 18a, 18b, 18c, 18d and deriving pixel values from overlap regions 20a, 22a, 20b, 22b, 20c, 22c, 20d, 22d. For example, the exclusive region 18d from frame 14d may be reproduced at panoramic frame region 26; the exclusive region 18a from frame 14a may be reproduced at panoramic frame region 28, the exclusive frame region 18b from frame 14b may be reproduced at panoramic frame region 32 and the exclusive frame region 18c from frame 14c may be reproduced at panoramic frame region 36. The panoramic frame 16 may also include hybrid regions 24, 30, 34, 39 derived from the respective overlap regions 20a, 22a, 20b, 22b, 20c, 22c, 20d, 22d. For example, hybrid region 30 may be derived from right overlap region 22a from frame 14a and left overlap region 20b from frame 14b. Hybrid region 34 may be derived from right overlap region 22b from frame 14b and from left overlap region 20c of frame 14c. Hybrid region 39 may be derived from right overlap region 22c from frame 14c and left overlap region 20d from frame 14d. Hybrid region 24 may be derived from right overlap region 22d from frame 14d and from left overlap region 20a from frame 14a. Hybrid regions 24, 30, 34, 39 may be derived from respective overlap regions in any suitable manner, for example, during stitching.

Figure 3:
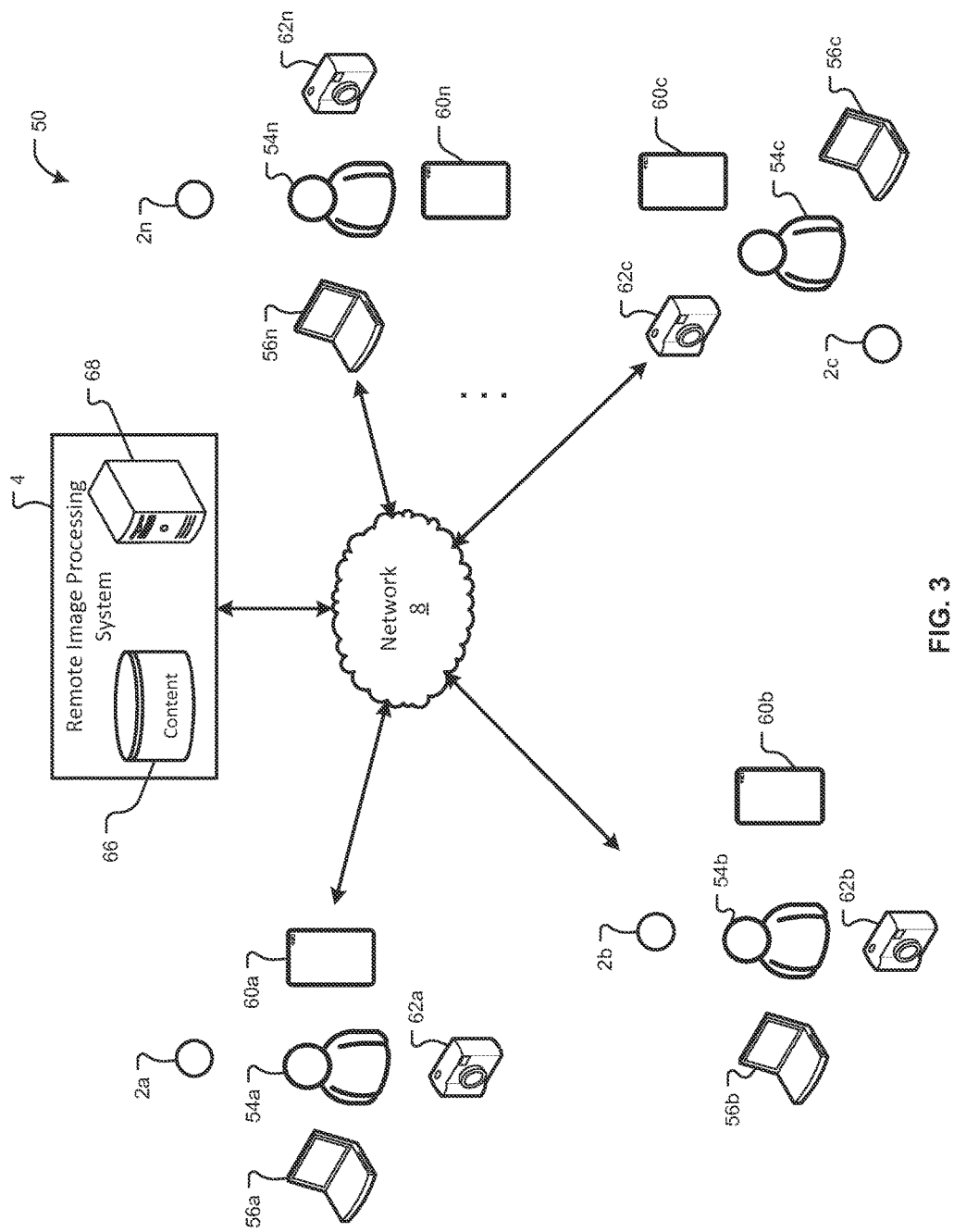
FIG. 3 is a diagram showing another example of an environment including various devices for formatting panoramic frames for transmission to a remote image processing system.

FIG. 3 is a diagram showing another example of an environment 50 including various devices for formatting panoramic frames for transmission to a remote image processing system 4. The environment 50 comprises a remote image processing system 4 and users 54a, 54b, 54c, 54n.

Each user 54a, 54b, 54c, 54n may use one or more user devices such as, for example, panoramic cameras 2a, 2b, 2c, 2n, digital cameras 62a, 62b, 62c, 62n, mobile devices 60a, 60b, 60c, 60n, or other computing devices 56a, 56b, 56c, 56n. Although four users 54a, 54b, 54c, 54n are shown, any suitable number of users 54a, 54b, 54c, 54n may be part of the environment. Also, although each user 54a, 54b, 54c, 54n shown in FIG. 3 is associated with a panoramic camera 2a, 2b, 2c, 2n, a mobile device 60a, 60b, 60c, 60n, a digital camera 62a, 62b, 62c, 62n and a computing device 56a, 56b, 56c, 56n, some users 54a, 54b, 54c, 54n may use additional user devices and/or fewer user devices than what is shown.

User devices may be utilized to capture videos, transmit videos to the remote image processing system 4, and/or perform video compression as described herein. Panoramic cameras 2a, 2b, 2c, 2n may include one or more image sensors and associated optics to capture panoramic panoramic videos. Panoramic cameras 2a, 2b, 2c, 2n may have a panoramic field-of-view larger than that of a standard camera. For example, panoramic cameras 2a, 2b, 2c, 2n may have a field-of-view of about 180° or greater. Some panoramic cameras 2a, 2b, 2c, 2n may have fields-of-view as large as 360° and/or 4n steradians. In some examples, a panoramic camera 2a, 2b, 2c, 2n may comprise a single image sensor with lenses, mirrors or other optics allowing the single image sensor to receive electromagnetic radiation (e.g., light) from the panaromic field-of-view. In some examples, a panoramic camera 2a, 2b, 2c, 2n may comprise multiple image sensors (e.g., with overlapping fields-of-view). The panoramic camera 2a, 2b, 2c, 2n (or another component of the environment 50) may be configured to stitch frames from the respective image sensors into a single panoramic frame. In some examples, a panoramic camera 2a, 2b, 2c, 2n may be configured to communicate with other components of the environment 50 utilizing, for example, a wired or wireless connection. For example, a panoramic camera 2a, 2b, 2c, 2n may upload a frame or frames to a companion user device, such as, a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a panoramic camera 2a, 2b, 2c, 2n may be configured to upload video directly to the remote image processing system 4, for example, via the network 8.

Digital cameras 62a, 62b, 62c, 62n may comprise any suitable device with one or more image sensors to capture an image and/or video. In some examples, digital cameras 62a, 62b, 62c, 62n may be configured to communicate with other components of the environment 50 utilizing, for example, a wired or wireless connection. For example, a digital camera 62a, 62b, 62c, 62n may upload images and/or videos to a mobile device 60a, 60b, 60c, 60n or computing device 56a, 56b, 56c, 56n via a wired connection, such as Universal Serial Bus (USB), or wireless connection, such as near field communication (NFC) or Bluetooth™. In some examples, a digital camera 62a, 62b, 62c, 62n may be configured to upload images and/or video directly to the remote image processing system 4, for example, via the network 8. Also, in some examples, a digital camera 62a, 62b, 62c, 62n may comprise a processor and/or other components to implement video compression, as described herein. Digital cameras 62a, 62b, 62c, 62n may have one or more than one image sensor and may have a standard or panoramic field-of-view.

A mobile device 60a, 60b, 60c, 60n may be any suitable type of computing device comprising a processor and data storage. In some examples, a mobile device 60a, 60b, 60c, 60n may be configured to receive video captured by a panoramic camera 2a, 2b, 2c, 2n or digital camera 62a, 62b, 62c, 62n and transfer the video for enhancement at the remote image processing system 4. In some examples, a mobile device 60a, 60b, 60c, 60n may execute a remote image processor for enhancing frames and/or videos received, for example, from a panoramic camera 2a, 2b, 2c, 2n or digital camera 62a, 62b, 62c, 62n. Also, in some examples, a mobile device 60a, 60b, 60c, 60n may comprise one or more image sensors and associated optics for capturing video and either uploading the video to the remote image processing system 4 or performing compression, described herein. In some examples, a mobile device 60a, 60b, 60c, 60n may be configured to communicate on a cellular or other telephone network in addition or instead of the network 8.

A computing device 56a, 56b, 56c, 56n may be any suitable type of computing device comprising a processor and data storage including, for example, a laptop computer, a desktop computer, etc. In some examples, a computing device 56a, 56b, 56c, 56n may be configured to receive videos captured by a panoramic camera 2a, 2b, 2c, 2n or digital camera 62a, 62b, 62c, 62n and transfer the videos for compression at the remote image processing system 4. In some examples, a computing device 56a, 56b, 56c, 56n may be configured to execute an image processor for enhancing videos received, for example, from a panoramic camera 2a, 2b, 2c, 2n or digital camera 62a, 62b, 62c, 62n. Also, in some examples, a computing device 56a, 56b, 56c, 56n may comprise one or more image sensors and associated optics for capturing video and either uploading the video to the remote image processing system 4 or performing compression locally.

The remote image processing system 4 may enhance panoramic frames received from users 54a, 54b, 54c, 54n (e.g., user devices associated with the user). The remote image processing system 4 may comprise one or more data stores 66 and one or more servers 68. The data store 66 may store panoramic frames and/or transmission frames received from the various user devices. The various components 68, 66 of the remote image processing system 4 may be at a common geographic location and/or may be distributed across multiple geographic locations. For example, the remote image processing system 4 may be implemented in whole or in part as a cloud or Software as a Service (SaaS) system. In some examples, the remote image processing system 4 may enhance panoramic frames received from multiple different users 54a, 54b, 54c, 54n (e.g., via their associated cameras, computing devices, or other devices). The various components of the environment 50 may be in communication with one another via a network 8. The network 8 may be and/or comprise any suitable wired or wireless network configured according to any suitable architecture or protocol. In some examples, the network 8 may comprise the Internet.

Figure 4:
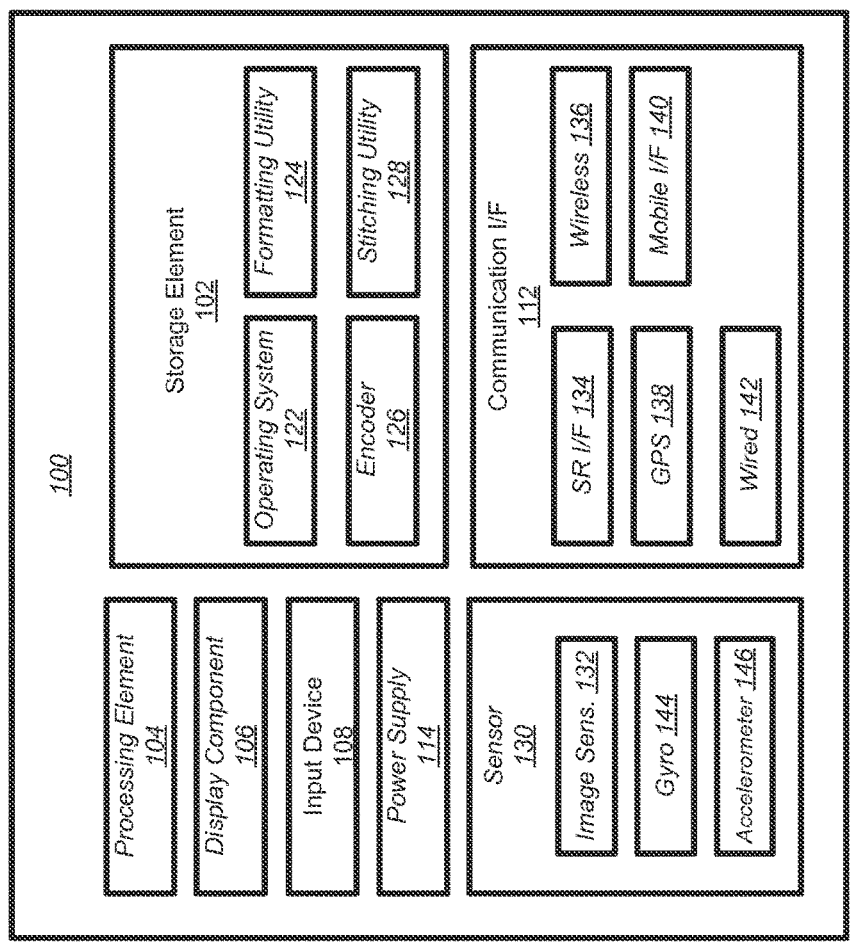
FIG. 4 is a block diagram showing an example architecture of a control circuit of a panoramic camera.

FIG. 4 is a block diagram showing an example architecture 100 of a control circuit 12 of a panoramic camera, such as the panoramic cameras 2, 2a, 2b, 2c, 2n. It will be appreciated that not all panoramic cameras will include all of the components of the architecture 100 and some panoramic cameras may include additional components not shown in the architecture 100. The architecture 100 may include one or more processing elements 104 for executing instructions and retrieving data stored in a storage element 102. The processing element 104 may comprise at least one processor. Any suitable processor or processors may be used. For example, the processing element 104 may comprise one or more digital signal processors (DSPs). The storage element 102 can include one or more different types of memory, data storage or computer readable storage media devoted to different purposes within the architecture 100. For example, the storage element 102 may comprise flash memory, random access memory, disk-based storage, etc. Different portions of the storage element 102, for example, may be used for program instructions for execution by the processing element 104, storage of images or other digital works, and/or a removable storage for transferring data to other devices, etc.

The storage element 102 may also store software for execution by the processing element 104. An operating system 122 may provide the user with an interface for operating the panoramic camera and may facilitate communications and commands between applications executing on the architecture 100 and various hardware thereof. An encoder utility 126 may be configured to encode frames according to a suitable encoding format for transmission. Example formats include, the H.264 format, the H.265 format, etc. A stitching utility 128 may be configured to stitch videos received from multiple image sensors 132 into a panoramic frame, for example, as described herein with respect to FIGS. 6-7. A formatting utility 124 may be configured to receive panoramic frames and/or image sensor frames (e.g., from one or more image sensors 132, the stitching utility 128, etc.) and format the frames for transmission to the remote image processing system 4, as described herein. The encoder utility 126 may encode frames received from image sensors 132 (e.g., image sensor frames), frames generated by the stitching utility 128 (e.g., panoramic frames) and/or generated by the formatting utility 124 (e.g., transmission frames).

When implemented in some panoramic cameras, the architecture 100 may also comprise a display component 106. The display component 106 may comprise one or more light emitting diodes (LEDs) or other suitable display lamps. Also, in some examples, the display component 106 may comprise, for example, one or more devices such as cathode ray tubes (CRTs), liquid crystal display (LCD) screens, gas plasma-based flat panel displays, LCD projectors, or other types of display devices, etc.

The architecture 100 may also include one or more input devices 108 operable to receive inputs from a user. The input devices 108 can include, for example, a push button, touch pad, touch screen, wheel, joystick, keyboard, mouse, trackball, keypad, light gun, game controller, or any other such device or element whereby a user can provide inputs to the architecture 100. These input devices 108 may be incorporated into the architecture 100 or operably coupled to the architecture 100 via wired or wireless interface. When the display component 106 includes a touch sensitive display, the input devices 108 can include a touch sensor that operates in conjunction with the display component 106 to permit users to interact with the image displayed by the display component 106 using touch inputs (e.g., with a finger or stylus). The architecture 100 may also include a power supply 114, such as a wired alternating current (AC) converter, a rechargeable battery operable to be recharged through conventional plug-in approaches, or through other approaches such as capacitive or inductive charging.

The architecture 100 may also include a communication interface 112, comprising one or more wired or wireless components operable to communicate with one or more other user devices and/or with the remote image processing system 4. For example, the communication interface 112 may comprise a wireless communication module 136 configured to communicate on a network, such as the network 8, according to any suitable wireless protocol, such as IEEE 802.11 or another suitable wireless local area network WLAN protocol. A short range interface 134 may be configured to communicate using one or more short range wireless protocols such as, for example, near field communications (NFC), Bluetooth™, Bluetooth LE™, etc. A mobile interface 140 may be configured to communicate utilizing a cellular or other mobile protocol. A Global Positioning System (GPS) module 138 may be in communication with one or more earth-orbiting satellites or other suitable position-determining systems to identify a position of the architecture 100. A wired communication module 142 may be configured to communicate according to the Universal Serial Bus (USB) protocol or any other suitable protocol.

Figure 5:
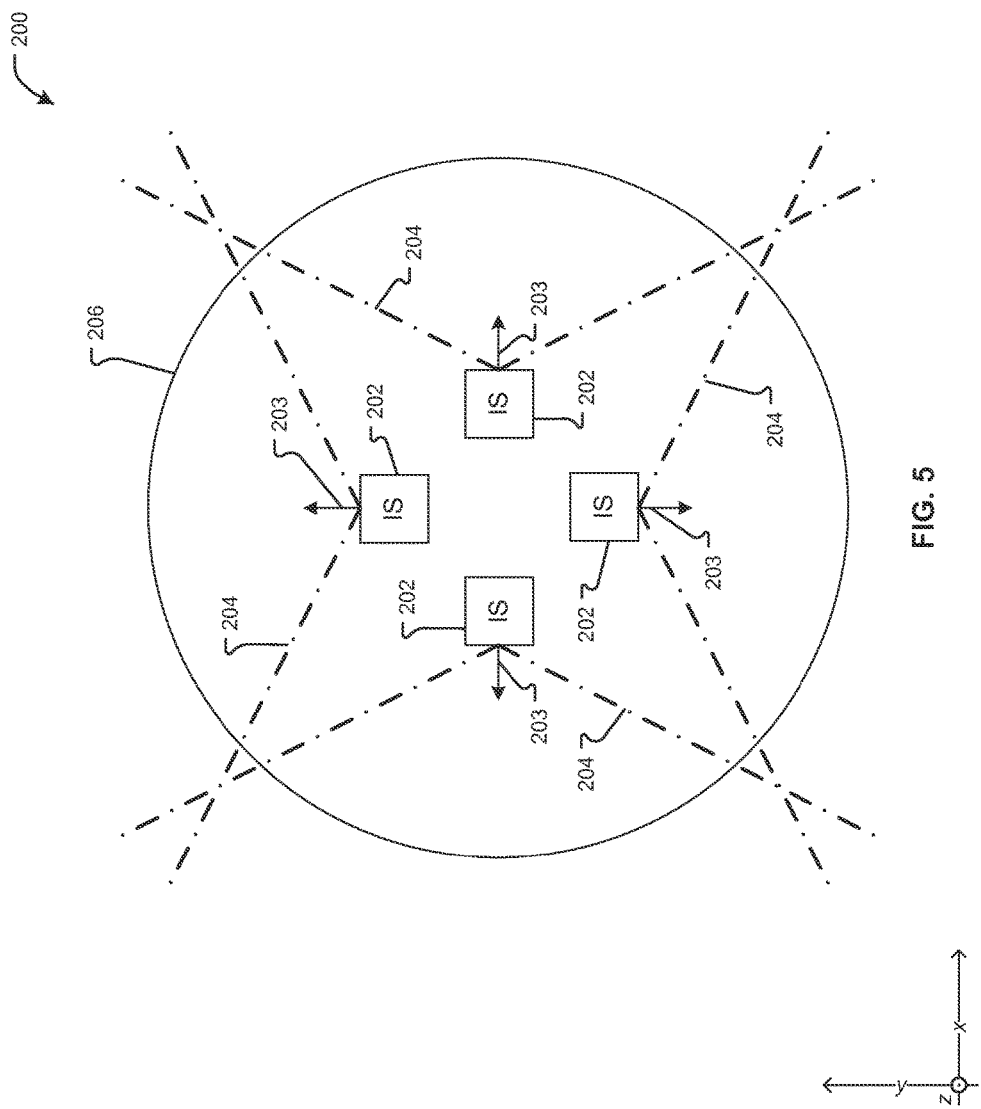
FIG. 5 is a diagram showing a cross-sectional view of one example of a panoramic camera comprising four image sensors.

The architecture 100 may also include one or more sensors 130 such as, for example, one or more image sensors and one or more motion sensors. An image sensor 132 is shown in FIG. 4. Some examples of the architecture 100 may include multiple image sensors 132, for example, as shown in FIGS. 1, 2 and 5. Motion sensors may include any sensors that sense motion of the architecture including, for example, gyroscopes 144 and accelerometers 146. Motion sensors, in some examples, may be included in user devices such as panoramic cameras, digital cameras, mobile devices, etc., that capture video to be compressed. The gyroscope 144 may be configured to generate a signal indicating rotational motion and/or changes in orientation of the architecture (e.g., a magnitude and/or direction of the motion or change in orientation). Any suitable gyroscope may be used including, for example, ring laser gyroscopes, fiber-optic gyroscopes, fluid gyroscopes, vibration gyroscopes, etc. The accelerometer 146 may generate a signal indicating an acceleration (e.g., a magnitude and/or direction of acceleration). Any suitable accelerometer may be used including, for example, a piezoresistive accelerometer, a capacitive accelerometer, etc. In some examples, the GPS interface 138 may be utilized as a motion sensor. For example, changes in the position of the architecture 100, as determined by the GPS interface 138, may indicate the motion of the GPS interface 138. Other types of motion sensors that may be included in the architecture 100 include digital compass sensors, other location sensors (e.g., utilizing beacon signals or time stamps to determine a current or past location of the architecture), time-of-flight or other depth sensors, etc. In some examples, an image sensor may also be a motion sensor. For example, frames captured by an image sensor may be analyzed to determine a direction and magnitude of the camera's motion.

FIG. 5 is a diagram showing a cross-sectional view of one example of a panoramic camera 200 comprising four image sensors 202. The image sensors 202 may be mounted in a mounting assembly 206 in any suitable manner. Adjacent image sensors 202 may be rotated by 90°. For example, centers of the respective fields-of-view 204 of the sensors 202 (indicated by image sensor direction 203) may be orthogonal to one another. The image sensors 202 may be or include any suitable type of sensor including, for example, charge coupled devices. Image sensors 202 may also include lenses, mirrors or other suitable optics, for example, as described with respect to FIG. 2. Each image sensor 202 may have a field-of-view indicated by 204. The fields-of-view 204 may partially overlap, as shown. In some examples, the fields-of-view 204 may be equal (e.g., the fields-of-view 204 may subtend the same angle. For example, each of the example fields-of-view 204 shown in FIG. 5 subtend 120°. Frames captured by the various image sensors 202 may be stitched into a panoramic frame. For example, collectively, the image sensors 202 may have a 360° field-of-view. Each image sensor may be directed in an image sensor direction 203. For example, respective image sensor directions 203 may be positioned in the middle of the respective fields-of-view 204 of the image sensors 202. In some examples, the panoramic camera 200 may comprise more or fewer image sensors either directed on the xy plane like the image sensors 202 or in another position. For example, the panoramic camera 200 may comprise one or more image sensors directed in the positive and/or negative z direction. The field-of-view of such an example of the panoramic camera 200 may be as much as $4n$ steradians.

Figure 6:
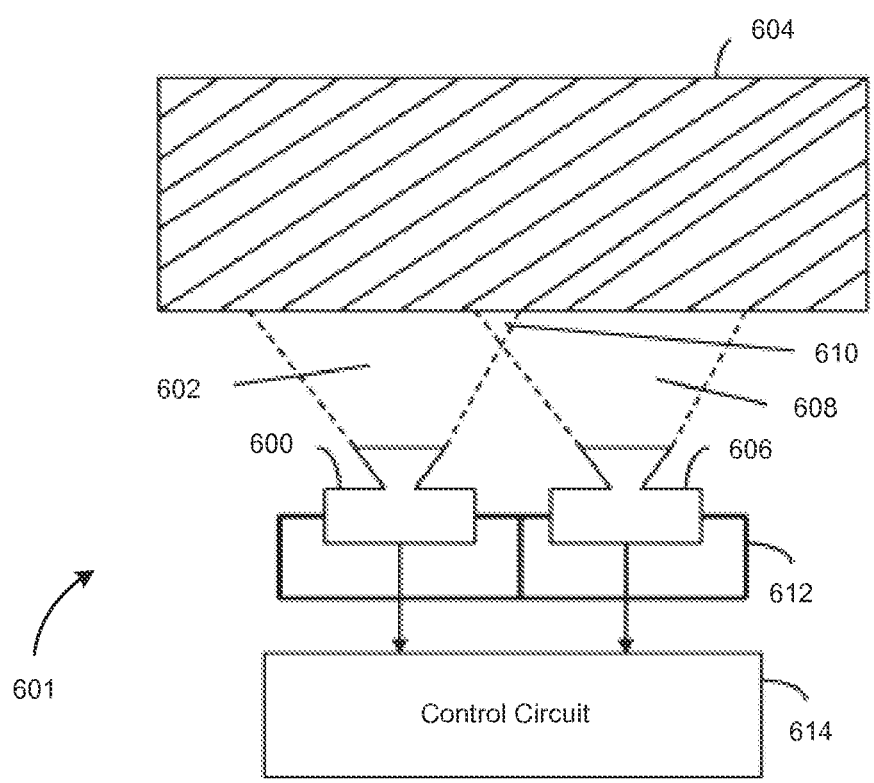
FIG. 6 is a diagram demonstrating one example of a calibration set up that may be used to stitch image sensor frames from a panoramic camera.

As described herein, a control circuit 12 of a panoramic camera (e.g., a stitching utility 128 executed by the control circuit 12) may be programmed to stitch image sensor frames from two or more image sensors with overlapping fields-of-view to generate a panoramic frame. For example, FIG. 6 is a diagram demonstrating one example of a calibration set up that may be used to stitch image sensor frames from a panoramic camera. A panoramic camera 601 comprises example image sensors 600, 606, a mounting assembly 612 and a control circuit 614. For example, the control circuit 614 may include the processing element 104 executing the stitching utility 128, described herein. Image sensor 600 has a field-of-view 602, while image sensor 606 has a field-of-view 608.

The fields-of-view 602, 608 have an overlap 610. The image sensors 600, 606 may have fixed positions on the mounting assembly 612. The image sensors 600, 606 may have fixed positions other than those shown in FIG. 6. For example, the image sensors 600, 606 may have the fixed positions, similar to the fixed positions of the other various image sensors described herein, or any other suitable position. Although two image sensors 600, 606 are shown in FIG. 6, any suitable number of image sensors may be used including, for example, four image sensors as illustrated in FIG. 5. The image sensors 600, 606 may capture image data and provide the image data to the control circuit 614. The control circuit 614 may be or comprise any suitable type of computing device comprising a central processor, a graphics processing unit and/or another type of processor.

The control circuit 614 may be programmed to utilize frames captured by the image sensors 600, 606 to determine distortion parameters and/or alignment parameters, such as the overlap 610. For example, the image sensors 600, 606 may capture calibration frames showing a standardized calibration fixture 604 from the first and second image sensors 600, 606. The calibration fixture 604 may be any object having thereon a test pattern that allows the control circuit 614 to determine the level of overlap 610 at the pixel level. For example, the calibration fixture 604 may comprise a block, a plate, a cylinder, etc. made from plastic, wood, metal or any other suitable material. The test pattern may be affixed to the calibration fixture 604 in any suitable manner. For example, the test pattern may be painted, printed, etc. In some examples, the test pattern may be printed on a decal that is bonded to the calibration fixture. In addition, the calibration fixture 604 may enable the control circuit 614 to accommodate any vertical, horizontal, or rotational misalignment of the image sensors 600, 606 as well as any focus errors or areas of soft focus for each image sensor 600, 606 so that the image correction processing can be applied.

In various examples, the test pattern of the calibration fixture 604 includes straight lines. For example, the test pattern may comprise a set of diagonal lines, as illustrated in FIG. 6, or may be in the form of a grid. The control circuit 614 may review frames showing the test pattern captured by various image sensors 600, 606. In various examples, the field-of-view 602, 608 of one or both of the image sensors 600, 606 may have areas of distortion, for example, due to a lens in the optical system (e.g., a lens associated with the image sensor 600, 606 and/or the curved outer surface of an enclosure described herein), or due to some other irregularity in the system. To produce an output image and/or video stream from both image sensors 600, 606, it may be desirable to minimize or eliminate non-uniform distortion, for example, along the edges where frames are joined. For example, frames of the calibration fixture 604 captured by the image sensors 600, 606 may be analyzed by the control circuit 614 to generate an indication of distortions for points in an image plane corresponding to each of the image sensors 600, 606. The control circuit may derive distortion parameters for the various image sensors 600, 606, for example, by observing the curvature of the straight lines of the test pattern as depicted in the frames. For example, distortion parameters may correct for curvature in the straight lines of the test pattern as depicted in frames from the image sensors 600, 606. The control circuit 614 may apply corrections to the distortions in order to generate stitched images and/or video with minimal distortions between image sensor feeds.

The test pattern of the calibration fixture 604 may, in some examples, comprise a color chart and/or uniform gray chart. For example, these charts may allow the control circuit 614 to analyze potential differences in color accuracy, relative illumination, and relative uniformity between image sensors 600, 606. Differences may be stored as correction factors and may be utilized by the control circuit 614 in the stitching process to reduce noticeable differences between image streams. The calibration process may allow for a stitched frame to be stitched from multiple frames received from the image sensors with the viewer being unable to perceive any meaningful change in image quality through the entire stitched frame. The stitched frame may be a stand-alone image or may be part of a panoramic video.

Figure 7:
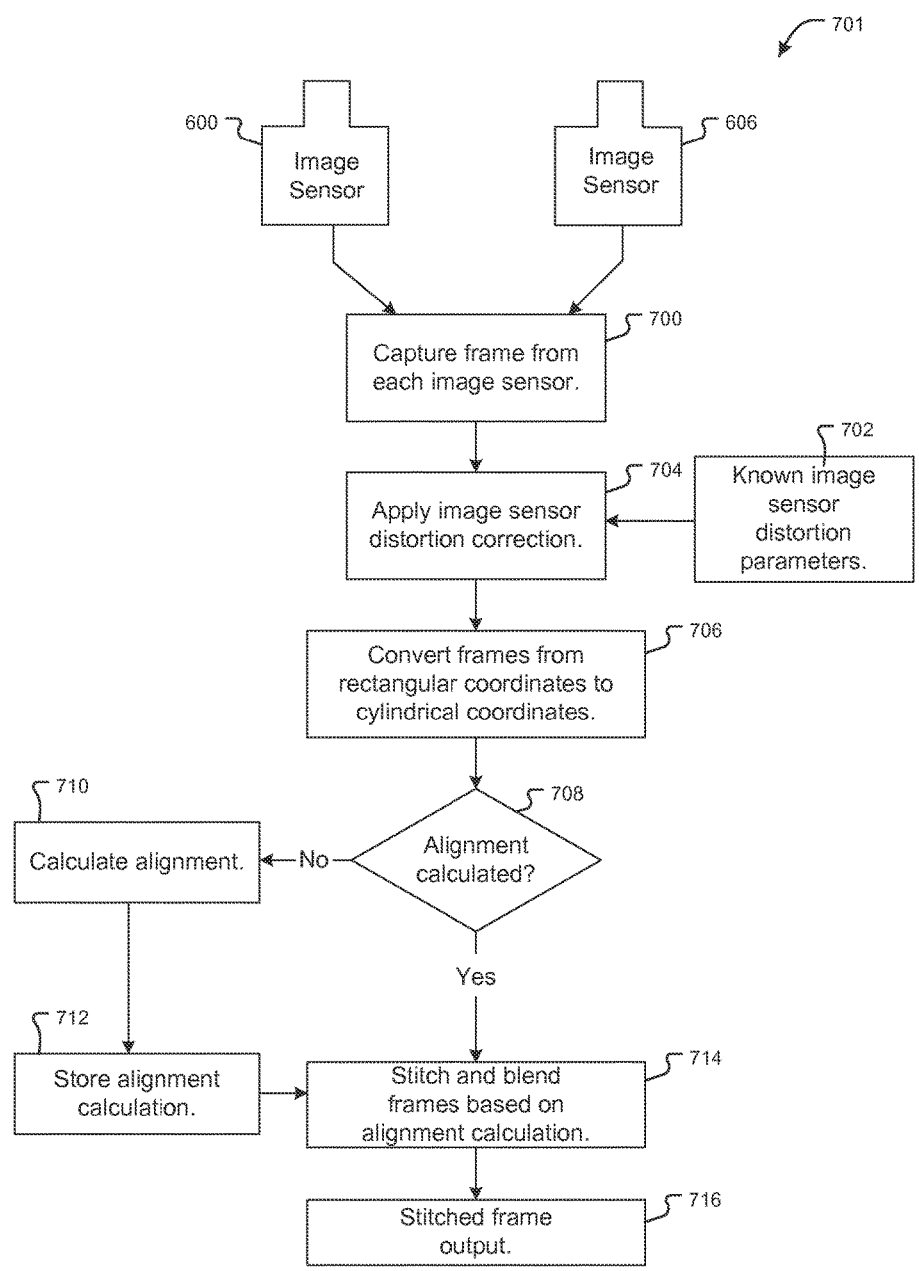
FIG. 7 is a workflow showing one example of a process for stitching frames from image sensors of a panoramic camera.

FIG. 7 is a workflow 701 showing one example of a process for stitching frames from image sensors of a panoramic camera. The workflow 701 is described in the context of the panoramic camera 601 of FIG. 6, although it may be used with any of the panoramic cameras described herein. At 700, the control circuit 614 may capture image sensor frames from the image sensor 600 and the image sensor 606 (e.g., simultaneously). The image sensor frames may be still images and/or part of a video. Stored camera or image sensor distortion parameters 702 may be applied by the control circuit at 704. For example, the image sensor distortion parameters may be based on image sensor frames showing the calibration fixture 604, as described herein. Optionally, at 706, the control circuit 614 may convert the image sensor frames to cylindrical coordinates. For example, frames captured by the image sensors 600, 606 may be initially configured according to the lens or lenses used with the image sensors 600, 606. For example, if a fisheye lens is used, incoming frames may be arranged according to a fisheye coordinate system where each point in the frame had a viewing angle proportional to its distance from the center of the frame. Converting the frames to cylindrical coordinates may facilitate the stitching process by allowing the control circuit to align the extremities of the frames.

At 708, the control circuit 614 may determine whether an alignment has been calculated. If not, an alignment between the image sensors 600, 606 may be found at 710 and stored at 712. Generating the alignment may comprise identifying the overlap regions of the respective frames and determining a translation kernel to correct for parallax or ghosting artifacts. In some examples, overlap regions may be determined considering the position of the optical centers of the image sensors 600, 606 and their respective fields-of-view 602, 608. Translation kernels may be found in any suitable manner. For example, translation kernels may be found considering a reference frame from a reference image sensor, as described herein. The control circuit 614 may proceed to 714. If an alignment between the image sensors 600, 606 has already been found at 708, the control circuit 614 may also proceed to 714 where it may stitch the frames, blending the images based on the stored alignment calculation. For example, stitching may include translating pixels from the frames as indicated by the translation kernel. Stitching at 714 may be performed in any suitable manner. In some examples, the control circuit 614 may apply an alpha blending method. According to an alpha blending method, the control circuit 614 may average redundant pixels from adjacent frames (e.g., pixels from the overlap regions). Different stitching algorithms may provide best results with different levels of overlap between adjacent frames, as described herein. The result of the stitching at 714 may be a stitched frame, output at 716. The stitched frame may be a stand-alone image or part of a video. Although the workflow 701 is described with respect to two image sensors 600, 606, it may be used to stitch any suitable number of frames from any suitable number of image sensors.

Camera distortion and alignment parameters used in the workflow 701 may be found utilizing a calibration process, for example, as described above with respect to FIG. 6. Example image sensor distortion parameters include a lens distortion parameter and an image sensor field-of-view (FOV) parameter, which may be found for each image sensor of a panoramic camera. Example alignment parameters include linear and/or angular offsets between each image sensor that may be used to determine the overlap between the images generated by the image sensors (e.g., 610 in FIG. 6), and translation kernels, as described herein. Although the workflow 701 is described as being executed by a control circuit 614, in some examples, stitching may be performed (or re-performed) at the remote processing system 4, for example.

Figure 8:
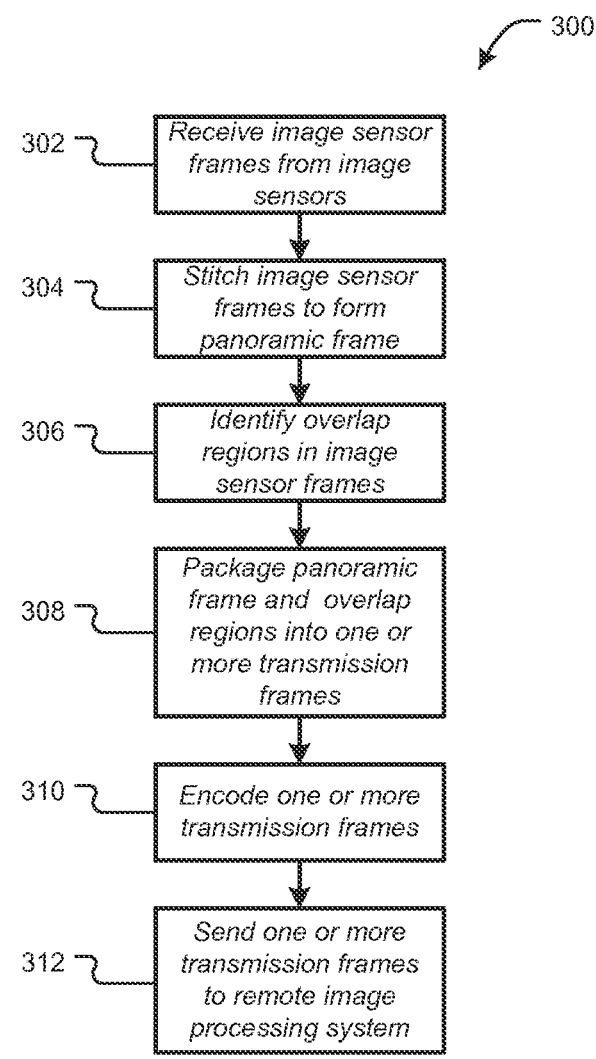
FIG. 8 is a flow chart showing one example of a process flow that may be executed by a panoramic camera (e.g., a control circuit of a panoramic camera) to captured video and transmit it to a remote image processor system.

FIG. 8 is a flow chart showing one example of a process flow 300 that may be executed by a panoramic camera (e.g., a control circuit 12 of a panoramic camera) to capture video and transmit it to a remote image processor system 4. For example, the process flow 300 may be executed by the formatting utility 124 described herein. The process flow 300 is described with reference to the example environment 10 of FIG. 1. At 302, the control circuit 12 may receive image sensor frames from two or more image sensors of the panoramic camera. In the example of FIG. 1, for example, the control circuit 12 may receive the image sensor frames 14*a*, 14*b*, 14*c*, 14*d*. At 304, the control circuit 12 (e.g., a stitching utility 128) may stitch the two or more image sensor frames 14*a*, 14*b*, 14*c*, 14*d* to form a panoramic frame, such as the panoramic frame 16.

At 306, the control circuit 12 (e.g., the formatting utility 124) identify overlap regions 20*a*, 22*a*, 20*b*, 22*b*, 20*c*, 22*c*, 20*d*, 22*d* from the image sensor frames 14*a*, 14*b*, 14*c*, 14*d*. Overlap regions may be identified in any suitable manner. In some examples, the stitching utility 128 may return an indication of the positions in the spatial arrangement of pixel values in the various image sensor frames 14*a*, 14*b*, 14*c*, 14*d* that correspond to overlap regions. Also, in some examples, the formatting utility 124 may receive an indication of the fields-of-view of the various image sensors 10a, 10b, 10c, 10d and derive the overlap regions therefrom, for example, by projecting the overlapping portions of the fields of view to the respective image sensor elements of the image sensors 10a, 10b, 10c, 10d.

At 308, the control circuit 12 (e.g., the formatting utility 124) may package the panoramic frame 16 and the overlap regions 20a, 22a, 20b, 22b, 20c, 22c, 20d, 22d into one or more transmission frames. In some examples, (FIGS. 9-10) the panoramic frame 16 and overlap regions 20a, 22a, 20b, 22b, 20c, 22c, 20d, 22d may be incorporated into a single transmission frame 38. In other examples, (FIGS. 11-12) the panoramic frame 16 and the various overlap regions 20a, 22a, 20b, 22b, 20c, 22c, 20d, 22d may be incorporated into multiple transmission frames 38, 38' that may be part of a sequence 40 of transmission frames to be sent to the remote image processing system 4. At 310, the control circuit 12 (e.g., the encoder utility 126) may encode the transmission frames packaged at 308. For example, at 308, the formatting utility may determine positions for the pixel values of the panoramic frame 16 and the respective overlap regions 20a, 22a, 20b, 22b, 20c, 22c, 20d, 22d within one or more transmission frames. The positions determined at 308 may be provided to the encoder utility 126, which may generate one or more encoded transmission frames according to any suitable encoding standard. In some examples, the encoder 126 may generate the encoded transmission frames according to the H.264 format and/or the H.265 format. The control circuit 12 may send the encoded transmission frames to the remote image processing system 4 at 312.

FIG. 9 is a diagram showing one example of a transmission frame 320 that may be generated by the control circuit 12 of a panoramic camera 2 (e.g., the formatting utility 124). The transmission frame 320 may comprise a two-dimensional spatial arrangement of pixel values. The pixel values of the transmission frame 320 and their spatial arrangement relative to one another may be determined, for example, by the formatting utility 124 as described above. The number and arrangement of pixel positions according to the spatial arrangement shown in FIG. 9 may be determined by any suitable factor. For example, some encoder utilities 126 may have a maximum resolution (e.g., a maximum number of pixel positions, maximum dimensions in the X and/or Y direction, etc.). Also, in some examples, the size of the transmission frame 320 may be limited by a number of display pixels in display hardware (e.g., of a user device for viewing the frame such as user device 6). In some examples, the control circuit 12 may be configured to write to the transmission frame 320 cropping data indicating the area of the transmission frame 320 that includes the panoramic frame 16. For example, the cropping data may describe a cropping FIG. 324 that delimits the position of the panoramic frame 16 in the transmission frame 320. In some examples, a user device 6 or other device that receives the transmission frame 320 as a still image and/or as part of a video may read the cropping data and playback (e.g., display) only the panoramic frame 16 and may not playback the overlap regions 20a, 22a, 20b, 22b, 20c, 22c, 20d, 22d. The cropping data may be written to the transmission frame 320 in any suitable manner. In some examples, cropping data may be incorporated into the transmission frame 320 by the encoder utility 126 as a parameter of the encoding format. For example, the cropping data may be stored as a cropping rectangle or crop-rect parameter according to the H.265 encoding format.

In some examples, the control circuit 12 (e.g., the formatting utility 124) may be programmed to modify the size of one or more of the panoramic frame 16 and/or the overlap regions 20a, 22a, 20b, 22b, 20c, 22c, 20d, 22d to fit them into a transmission frame. For example, FIG. 10 is a diagram showing one example of a transmission frame 322 in which the panoramic frame 16 is divided into two panoramic frame sections 16a, 16b. In the example of FIG. 10, the panoramic frame 16 is split in the X dimension (e.g., into a left half frame section 16a and a right half frame section 16b). Any suitable split position or number of sections may be used, however.

In some examples, the control circuit (e.g., the formatting utility 124) may be programmed to scale the panoramic frame 16 and/or the overlap regions 20a, 22a, 20b, 22b, 20c, 22c, 20d, 22d before including in a transmission frame. For example, if the panoramic frame 16 is too large (e.g., has too many pixel positions) to fit into a transmission frame, the control circuit 12 may be programmed to apply a scaling function that reduces the number of pixel positions in the panoramic frame 16. For example, the control circuit 12 may be programmed to aggregate pixel values from adjacent pixel positions in one or more directions to determine new pixel values in the scaled panoramic frame. On playback, a playback device may "stretch" the scaled panoramic frame, for example, by adding pixel positions in the X dimension and interpolating pixel values for those pixel positions. Scaling may be uniform in all directions (e.g., isotropic scaling) and/or may be directional (anamorphic or anisotropic scaling). For example, if the panoramic frame 16 is too large in the X dimension to fit as desired in a transmission frame, the control circuit 12 may apply anamorphic or anisotropic scaling in the X direction to reduce the number of X direction pixel positions in the frame.

Figure 11:
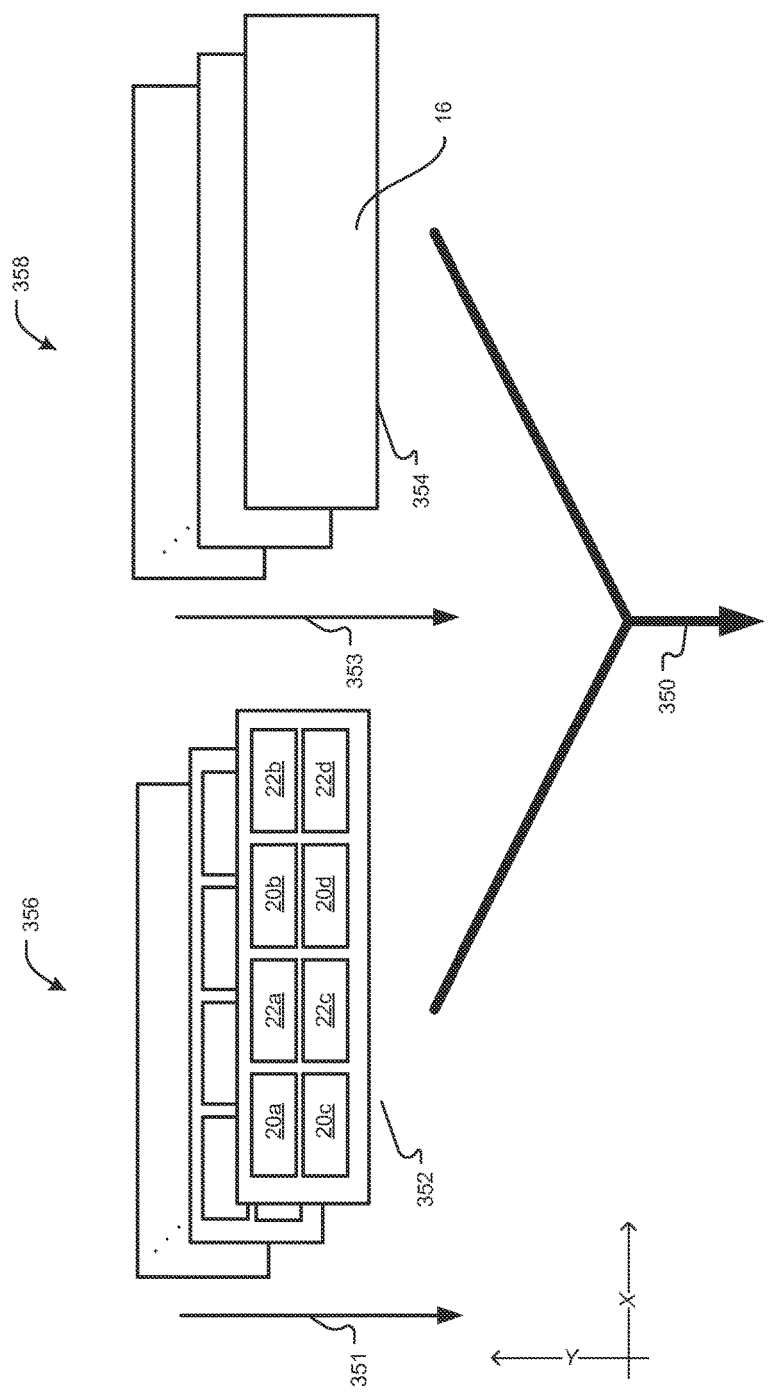
FIG. 11 is a diagram showing a transmission frame sequence where the panoramic frame and the overlap regions are included in different transmission frames.

FIG. 11 is a diagram showing a transmission frame sequence 350 where the panoramic frame 16 and the overlap regions are included in different transmission frames 354, 352. The transmission frame sequence 350 may be generated by the control circuit 12 of the panoramic camera 2 (e.g., the formatting utility 124) and sent to the remote image processing system 4 and/or another device, such as user device 6. Transmission frame 354 may comprise the panoramic frame 16. For example, the spatial arrangement of pixel values of the panoramic frame 16 may be included in the transmission frame 354. Transmission frame 352 may include the overlap regions 20a, 22a, 20b, 22b, 20c, 22c, 20d, 22d. When the transmission frame sequence 350 is received for playback (e.g., by user device 6), the user device 6 may disregard the transmission frame 352 including the overlap regions 20a, 22a, 20b, 22b, 20c, 22c, 20d, 22d. The remote image processing system 4 may be programmed to recognize and analyze the frame 352, however.

The transmission frames 352, 354 may be incorporated into the transmission frame sequence 350 in any suitable order. In some examples, the transmission frame sequence 350 may be generated from respective queues of overlap regions (356) and panoramic frames 16 (358). The overlap transmission frame queue 356 may comprise transmission frames including overlap regions. The temporal order of the overlap transmission frame queue 356 (indicated by arrow 351) may correspond to the order in which the overlap regions were captured. Similarly, a temporal order of the panoramic transmission frame queue 358 (indicated by arrow 353) may correspond to the order in which the transmission frames were captured. In some examples, the control circuit 12 may create the transmission frame sequence 350 by selecting n frames from the overlap transmission queue 356 and then selecting n frames from the panoramic transmission frame queue 358. The variable n may take any suitable value including, for example, 1, 2, 3, etc.

FIG. 12 is a diagram showing another transmission frame sequence 360. According to the transmission frame sequence 360, the panoramic frame 16 is included in a transmission frame 362. The overlap regions 22b, 22c, 20c, 20d are included in a transmission frame 364. The overlap regions 20a, 22a, 22d, 20b are included in a transition frame 366. When the transmission frame sequence 360 is received for playback (e.g., by user device 6), the user device 6 may disregard the transmission frames 364, 366 including the overlap regions 20a, 22a, 20b, 22b, 20c, 22c, 20d, 22d. The remote image processing system 4 may be programmed to recognize and analyze the frames 364, 366, however.

The transmission frames 362, 364, 366 may be ordered in the transmission sequence 360 in any suitable manner. In some examples, the transmission frame sequence 360 may be generated from queues 368, 370, 372 of transmission frames including overlap regions and panoramic frames 16. For example, the queue 368 (indicated by arrow 361) may include overlap regions 20a, 22a, 22d, 20b. The queue 370 (indicated by arrow 363) may include overlap regions 22b, 22c, 20c, and 20d. The queue 372 may (indicated by arrow 365) may include panoramic frames 16. This is just one example distribution of the overlap regions 20a, 20b, 20c, 20d, 22a, 22b, 22c, 22d among the queues 368, 370. Any other suitable distribution may be used. Also, in some examples, the overlap regions may be distributed among more than two queues. The temporal order of the various queues, indicated by arrows 361, 363, 365, may indicate the order in which the panoramic frames and overlap regions were captured. In some examples, the control circuit 12 may create the transmission frame sequence 360 by selecting n frames from the queue 368, then selecting n frames from the queue 370, and then selecting n frames from the queue 372, although any suitable order for selecting among the queues 368, 370, 372 may be used. The variable n may take any suitable value including, for example, 1, 2, 3, etc.

In some examples, the control circuit 12 (e.g., formatting utility 124) may be programmed to apply compression to the panoramic frame 16 and/or the overlap regions 20a, 22a, 20b, 22b, 20c, 22c, 20d, 22d. This may reduce the size of the transmission frame or frames, thus reducing required bandwidth. In some examples, the control circuit 12 may be configured to identify compression features from the panoramic frame 16 and/or overlap regions 20a, 22a, 20b, 22b, 20c, 22c, 20d, 22d. Example compression features include spatial continuity features, sometimes referred to as i-frame features, and motion vector features, sometimes referred to as p-frame features or b-frame features.

Spatial continuity features may comprise regions of adjacent pixel locations having pixel values that are the same or similar. For example, the control circuit 12 may divide a frame (e.g., the panoramic frame 16) or a region (e.g., an overlap region 20a, 22a, 20b, 22b, 20c, 22c, 20d, 22d) into pixel blocks. Pixel blocks may comprise a plurality of pixel values that have contiguous pixel locations according to the spatial arrangement of a frame or region. Pixel blocks may be of any suitable size or shape. In some examples, pixel blocks may be squares including, for example, 4×4 blocks of pixel values, 8×8 blocks of pixel values, 16×16 blocks of pixel values, etc. Non-square pixel blocks may also be used in some examples such as, for example, 16×8 blocks, 8×16 blocks, etc. Also, pixel blocks in some examples are not rectangular. In some examples, a 16×16 block of pixel values is referred to as a macroblock. When the control circuit 12 identifies a spatial continuity feature including two or more pixel blocks, it may replace one or more subject pixel blocks in the spatial continuity feature with data referencing a baseline pixel block. The data referencing the baseline pixel block may include, for example, a reference to the pixel locations of the baseline pixel block and a difference between the pixel values at the subject pixel block and the pixel values at the baseline pixel block. In some examples, the control circuit 12 may identify spatial continuity features indicating continuities between related overlap regions. For example, the subject pixel block may be in one related overlap region while the reference pixel block may be in the other related overlap region.

Motion vector features may occur when the same or a similar object appears in more than one frame or region, often at different positions. Motion vector features may also be identified by pixel blocks. For example, a motion vector may describe a difference between a position of a pixel block in a first frame or region (a subject pixel block) and the position of the same pixel block or a similar pixel block in a second frame or region (a reference pixel block). When the control circuit 12 identifies a motion vector feature, it may replace the subject pixel block with data referencing the reference pixel block. Motion vector features may extend between a first frame and a second frame positioned later in a frame sequence (e.g., p-frame features). In some examples, motion vector features may extend between a first frame and one or more frames positioned later in a frame sequence, and between the first frame and one or more frames positioned earlier in the frame sequence (e.g., b-frames).

Because of the nature of the panoramic frame 16 and overlap regions 20a, 22a, 20b, 22b, 20c, 22c, 20d, 22d, the control circuit may be likely to find compression features between some frames and unlikely to find compression features in others. For example, as described herein, pairs of related overlap regions may show a common portion of the scene captured by the panoramic camera. For example, referring to FIG. 1, related overlap regions may include overlap regions 20a and 22d (image sensors 10a, 10d); overlap regions 20b and 22a (image sensors 10b, 10a); overlap regions 20c and 22b (image sensors 10d, 10c); and overlap regions 20d and 22c (image sensors 10d, 10c). The control circuit 12 may be configured to identify spatial continuity features among related overlap regions. In some examples, the control circuit 12 may also be configured to identify motion vector features between related overlap regions. For example, because related overlap regions show the respective common portions of the scene from different angles, objects (e.g., pixel blocks) depicted in one related overlap region may appear at a different position in the other related overlap region. Differences in object position between related overlap regions may be expressed as motion vectors, enabling the control circuit to apply motion vector compression techniques, as described above. Accordingly, when writing the respective regions and frame to transmission frames, the control circuit may replace data pixel blocks with compression references, as described.

In some examples, the control circuit 12 (e.g., formatting utility 124) may be programmed to compress the panoramic frame 16 and/or the overlap regions 20a, 22a, 20b, 22b, 20c, 22c, 20d, 22d by taking pixel value differences. For example, each set of related overlap regions may also be similar to a hybrid region of the panoramic frame 16. For example, referring again to FIG. 1, hybrid region 24 may be derived from related overlap regions 22d, 20a; hybrid region 30 may be derived from related overlap regions 22a, 20b;

hybrid region 34 may be derived from related overlap regions 22b, 20c; and hybrid region 39 may be derived from overlap regions 22c and 20d. As a result, differences between related overlap regions and their associated hybrid region may be small. Accordingly, the control circuit may replace related overlap regions and/or hybrid regions of the panoramic frame 16 with references to other regions.

FIG. 13 is a flowchart showing one example of a process flow 1000 for compressing a panoramic frame and overlap areas by taking pixel value differences. At 1002, the control circuit 12 (e.g., the formatting utility 124) may find a first difference indicating a difference between a hybrid region (e.g., hybrid region 24) and a first related overlap region (e.g., overlap region 22d of frame 14d). The first difference may be expressed as a difference between pixel values at the hybrid region 24 and pixel values at corresponding pixel locations at the first related overlap region. Instead of writing the first related overlap region to a transmission frame, the control circuit 12 may, at 1004, write the first difference to the transmission frame. Because the pixel values of the hybrid region are similar to the pixel values of the first related overlap region, the first difference may be relatively small. Writing the first difference to the transmission frame instead of the first related overlap region, then, may reduce the size of the transmission frame. At 1006, the control circuit 12 may find a second difference between the first difference and a second related overlap region (e.g., overlap region 20a of frame 14a). At 1008, the control circuit 12 may write the second difference to a transmission frame, which may be the same transmission frame to which the first difference was written at 1004 or a different transmission frame. The control circuit 12 may execute the process flow 1000 for each set of related overlap regions and hybrid region. In some examples, instead of finding the difference between the first difference and the second related overlap region, the control circuit 12 may find the second difference between the second related overlap region and the hybrid region. Compression, either utilizing differences as described with respect to FIG. 13 or utilizing compression features, may be applied in examples where the panoramic frame 16 and overlap regions 20a, 22a, 20b, 22b, 20c, 22c, 20d, 22d are included in a single transmission frame (e.g., FIGS. 9 and 10) and/or in examples where the panoramic frame 16 and overlap regions 20a, 22a, 20b, 22b, 20c, 22c, 20d, 22d are included in multiple transmission frames (e.g., FIGS. 11 and 12).

In some examples, the control circuit 12 may be programmed to reduce the size of transmission frames by omitting portions of overlap regions that are directly reproduced into a stitched panoramic frame. FIG. 14 is a diagram showing one example of the panoramic frame 16 and image sensor frames 14a, 14b. Referring to the panoramic frame 16, FIG. 14 illustrates an example stitching seam 1202 in the hybrid region 30. The stitching seam 1202 may delimit a boundary between pixel values in the region 30 that are taken from corresponding pixel values in the image sensor frames 14a, 14b. FIG. 14 also illustrates blend limits 1206, 1208. Blend limits 1206, 1208 may indicate a boundary between pixel values that are reproduced directly from the respective image sensor frames 14a, 14b and pixel values that are derived from the image sensor frames 14a, 14b. For example, in the hybrid region 30, pixel values at pixel positions to the left of the blend limit 1206 may be reproduced directly from corresponding pixel positions at the overlap region 22a of the image sensor frame 14a. For example, pixel values at pixel positions to the left of the blend limit 1206 may be directly reproduced from a left portion 1210 of the overlap region 22a. Similarly, pixel values at pixel positions to the right of the blend limit 1208 may be reproduced directly from corresponding pixel positions at the overlap region 20b of the image sensor frame 14b (e.g., from right portion 1216 of the overlap region 20b). Pixel values at pixel positions between the blend limits 1206, 1208 may be derived from overlap regions 22a, 20b.

As a result, a complete copy of the panoramic frame 16 and overlap regions 22a, 22b may be made by including the panoramic frame 16 and non-duplicative portions 1212, 1214 of the overlap regions 22a, 20b (e.g., portions of the overlap regions 22a, 20b that are not directly reproduced at the panoramic frame 16). Non-duplicative portion 1214 of the overlap region 20b may extend from a left edge 1220 of the overlap region 20b to a blend limit 1224. The blend limit 1224 may be a mapping of the blend limit 1208 onto the overlap region 20b. For example, the blend limit 1224 may be at a position in the overlap region 20b equivalent to the position of the blend limit 1208 in the hybrid region 30. (In FIG. 14, the non-duplicative portion 1214 is also indicated by an arrow 1228). Similarly, the non-duplicative portion 1212 of the overlap region 22a may extend from a right edge 1222 of the overlap region 22a to a blend limit 1226. (In FIG. 14, the non-duplicative portion 1212 is indicated by an arrow 1230.) The blend limit 1226 may be a mapping of the blend limit 1206 onto the overlap region 22a. For example, the blend limit 1226 may be at a position in the overlap region 22a equivalent to the position of the blend limit 1206 in the hybrid region 30.

When creating transmission frames, as described herein, the control circuit 12 may be programmed to include only non-duplicative portions of overlap regions 20a, 22a, 20b, 22b, 20c, 22c, 20d, 22d, thus reducing the size of the transmission frames. The control circuit may identify non-duplicative portions of the overlap regions 20a, 22a, 20b, 22b, 20c, 22c, 20d, 22d in any suitable manner. For example, referring to the hybrid region 30 and the overlap regions 20b and 22a, the control circuit 12 (e.g., the formatting utility 124) may receive (e.g., from a stitching utility 128) an indication of the position of the stitching seam 1202 in the hybrid region 30. Additionally, the stitching utility 128 or other suitable source may provide the position of the blend limits 1206, 1208 in the hybrid region 30.

The control circuit 12 (e.g., the formatting utility 124) may map the stitching steam 1202 and blend limits 1206, 1208 to the respective overlap regions 20b and 22a. Mapping the stitching seam 1202 and blend limits 1206, 1208 to the overlap regions may include finding equivalent seams and blend limits at positions in the overlap regions 20b, 22a equivalent to the positions of the stitching seam 1202 and blend limits 1206, 1208 at the hybrid region 30. For example, referring to FIG. 14, the seam 1232 at the overlap region 22a and the seam 1234 in the overlap region 20b may be equivalent to the stitching seam 1202. The blend limits 1226 and 1236 in the overlap region 22a may be equivalent to the blend limits 1206 and 1208, respectively, at the hybrid region 30. Similarly, the blend limits 1238 and 1224 at the overlap region 20b may be equivalent to the blend limits 1206 and 1208, respectively, at the hybrid region 30. To identify the non-duplicative portions 1212, 1214 of each overlap region 22a, 22b, the control circuit 12 may identify pixel locations from an edge of the frame to the blend limit beyond the stitching seam. For example, referring to overlap region 22a, the non-duplicative portion 1212 may comprise pixel positions from the edge 1222 of the frame 14a, across the stitching seam 1232 to the blend limit 1226. Similarly, the non-duplicative portion 1216 may extend from the edge 1220 of the frame 14*b*, across the stitching seam 1234 to the blend limit 1224.

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer readable medium for use by or in connection with an instruction execution system such as a processing component in a computer system. In this sense, the logic may comprise, for example, statements including instructions and declarations that can be fetched from the computer readable medium and executed by the instruction execution system. In the context of the present disclosure, a "computer readable medium" can be any medium that can contain, store, or maintain the logic or application described herein for use by or in connection with the instruction execution system. The computer readable medium can comprise any one of many physical media such as magnetic, optical, or semiconductor media. More specific examples of a suitable computer readable media include, but are not limited to, magnetic tapes, magnetic floppy diskettes, magnetic hard drives, memory cards, solid-state drives, USB flash drives, or optical discs. Also, the computer readable medium may be a random access memory (RAM) including, for example, static random access memory (SRAM) and dynamic random access memory (DRAM), or magnetic random access memory (MRAM). In addition, the computer readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A panoramic camera for formatting video frames for transmission to a remote image processing system, the panoramic camera comprising:
   a first image sensor, the first image sensor comprising:
      a first image sensor element comprising a first plurality of pixels; and
      a first lens assembly positioned to focus light from a first field-of-view onto the first image sensor element;
   a second image sensor, the second image sensor comprising:
      a second image sensor element comprising a second plurality of pixels; and
      a second lens assembly positioned to focus light from a second field-of-view onto the second image sensor element; and
   a control circuit comprising at least one processor, wherein the control circuit is programmed to:
      receive from the first image sensor a first frame comprising a first plurality of pixel values and a first two-dimensional spatial arrangement of the first plurality of pixel values, wherein the first two-dimensional spatial arrangement comprises a first overlap region, the first overlap region comprising pixel values from the first plurality of pixel values corresponding to a first portion of the first plurality of pixels that receive light focused from a second portion of the first field-of-view that overlaps the second field-of-view;
      receive from the second image sensor a second frame comprising a second plurality of pixel values and a second two-dimensional spatial arrangement of the second plurality of pixel values, wherein the second two-dimensional spatial arrangement comprises a second overlap region, the second overlap region comprising pixel values from the second plurality of pixel values corresponding to a third portion of the second plurality of pixels that receive light focused from a fourth portion of the second field-of-view that overlaps the first field-of-view;
      stitch the first frame and the second frame to form a panoramic frame, the panoramic frame comprising a panoramic frame plurality of pixel values and a two-dimensional panoramic frame spatial arrangement of the panoramic frame plurality of pixel values, wherein the two-dimensional panoramic frame spatial arrangement of the panoramic frame plurality of pixel values comprises:
         a first region comprising pixel values selected from the first plurality of pixel values of the first frame;
         a second region comprising pixel values selected from the second plurality of pixel values of the second frame; and a hybrid region comprising pixel values derived from the first overlap region and the second overlap region;

generate a transmission frame comprising a two-dimensional transmission frame spatial arrangement of pixel values, the two-dimensional transmission frame spatial arrangement of pixel values comprising the panoramic frame, the first overlap region separated from a first region of pixel values exclusive to the first field-of-view of the first frame, and the second overlap region separated from a second region of pixel values exclusive to the second field-of-view of the second frame; and send the transmission frame to the remote image processing system.

2. The panoramic camera of claim 1, wherein the control circuit is further programmed to write, to the transmission frame, cropping data describing a cropping figure, wherein the cropping figure delimits a position of the panoramic frame in the two-dimensional transmission frame spatial arrangement of pixel values.

3. The panoramic camera of claim 1, wherein the control circuit is further programmed to:

determine a left-side portion of the panoramic frame comprising pixel values from a left side of the panoramic frame spatial arrangement; and determine a right-side portion of the panoramic frame comprising pixel values form a right-side of the panoramic frame spatial arrangement, wherein, according to the two-dimensional transmission frame spatial arrangement, the left-side portion is positioned above the right-side portion.

4. The panoramic camera of claim 1, wherein the control circuit is further programmed to scale the panoramic frame to create a scaled version of the panoramic frame, and wherein the two-dimensional transmission frame spatial arrangement comprises the scaled version of the panoramic frame.

5. A method of formatting video frames for transmission to a remote image processing system, the method comprising:

receiving, by a control circuit of a panoramic camera, a first frame captured by a first image sensor of the panoramic camera, the first frame comprising a first spatial arrangement of pixel values;

determining, by the control circuit, a first overlap region comprising pixel values from a first portion of a first field-of-view of the first image sensor that overlaps a second field-of-view of a second image sensor;

receiving, by the control circuit, a second frame captured by the second image sensor of the panoramic camera, the second frame comprising a second spatial arrangement of pixel values;

determining, by the control circuit, a second overlap region comprising pixel values from a second portion of the second field-of-view of the second image sensor that overlaps the first field-of-view of the first image sensor;

generating a panoramic frame, by the control circuit, based at least in part on a set of frames comprising the first frame and the second frame, the panoramic frame comprising a third spatial arrangement of pixel values, wherein the third spatial arrangement of pixel values comprises:

a first frame region comprising pixel values selected from the first frame;

a second frame region comprising pixel values selected from the second frame; and a hybrid frame region comprising pixel values derived from the first overlap region and the second overlap region; and generating a transmission frame comprising a fourth spatial arrangement of pixel values including the panoramic frame, the first overlap region separated from a first region of pixel values exclusive to the first field-of-view of the first frame, and the second overlap region separated from a second region of pixel values exclusive to the second field-of-view of the second frame.

6. The method of claim 5, further comprising writing to the transmission frame cropping data describing a cropping figure, wherein the cropping figure delimits a position of the panoramic frame in the fourth spatial arrangement of pixel values.

7. The method of claim 5, further comprising:

determining a first-side portion of the panoramic frame comprising pixel values from a first side of the third spatial arrangement; and determining a second-side portion of the panoramic frame comprising pixel values form a second side of the third spatial arrangement adjacent the first side of the third spatial arrangement in a first direction, wherein, according to the fourth spatial arrangement, the first-side portion is positioned adjacent the second-side portion in a second direction perpendicular to the first direction.

8. The method of claim 5, further comprising:

finding a first difference between the hybrid frame region and the first overlap region; and writing the first difference to the transmission frame.

9. The method of claim 8, further comprising:

finding a second difference between the first difference and the second overlap region; and writing the second difference to the transmission frame.

10. The method of claim 5, further comprising:

identifying a motion vector between a first pixel block at the first overlap region and a second pixel block at the second overlap region; and replacing the first pixel block with a reference to the second pixel block, wherein the reference to the second pixel block comprises position data identifying position of the second pixel block in the second spatial arrangement of pixel values and difference data indicating a difference between the first pixel block and the second pixel block.

11. The method of claim 5, further comprising:

identifying a spatial continuity feature comprising a first pixel block in the first overlap region and a second pixel block in the second overlap region; and generating a reference to the second pixel block, wherein the reference to the second pixel block comprises position data identifying position of the second pixel block in the second spatial arrangement of pixel values and difference data indicating a difference between the first pixel block and the second pixel block.

12. The method of claim 5, further comprising:

receiving a first indication of a stitching seam in the hybrid frame region;

receiving a second indication of a first blend limit in the hybrid frame region on a first side of the stitching seam;

receiving a third indication of a second blend limit in the hybrid frame region on a second side of the stitching seam;

determining a first overlap region blend limit at a first position at the first overlap region that is equivalent to a second position of the first blend limit in the hybrid frame region;

identifying a first non-duplicative portion of the first overlap region, wherein the non-duplicative portion of the first overlap region comprises pixel positions of the first spatial arrangement of pixel values from a first edge of the first frame to the first overlap region blend limit;

determining a second overlap region blend limit at a third position at the second overlap region that is equivalent to a fourth position of the second blend limit in the hybrid frame region;

identifying a second non-duplicative portion of the second overlap region, wherein the non-duplicative portion of the second overlap region comprises pixel positions of the second spatial arrangement of pixel values from a second edge of the second frame to the second overlap region blend limit;

writing the non-duplicative portion of the first overlap region to the transmission frame; and writing the non-duplicative portion of the second overlap region to the transmission frame.

13. A method of formatting video frames for transmission to a remote image processing system, the method comprising:

receiving, by a control circuit of a panoramic camera, a first frame captured by a first image sensor of the panoramic camera, the first frame comprising a first spatial arrangement of pixel values, wherein the first spatial arrangement of pixel values comprises a first overlap region, the first overlap region comprising pixel values from a first portion of a first field-of-view of the first image sensor that overlaps a second field-of-view of a second image sensor;

receiving, by the control circuit, a second frame captured by the second image sensor of the panoramic camera, the second frame comprising a second spatial arrangement of pixel values, wherein the second spatial arrangement of pixel values comprises a second overlap region, the second overlap region comprising pixel values from a second portion of the second field-of-view of the second image sensor that overlaps the first field-of-view of the first image sensor;

generating a panoramic frame, by the control circuit, based at least in part on a set of frames comprising the first frame and the second frame, the panoramic frame comprising a third spatial arrangement of pixel values, wherein the third spatial arrangement of pixel values comprises:
 a first frame region comprising pixel values selected from the first frame;
 a second frame region comprising pixel values selected from the second frame; and
 a hybrid frame region comprising pixel values derived from the first overlap region and the second overlap region; and generating a first transmission frame comprising the panoramic frame;

generating a second transmission frame comprising a fourth spatial arrangement of pixel values indicating at least one of the first overlap region separated from a first region of pixel values exclusive to the first field-of-view of the first frame, or the second overlap region separated from a second region of pixel values exclusive to the second field-of-view of the second frame;

sending the first transmission frame to the remote image processing system; and sending the second transmission frame to the remote image processing system.

14. The method of claim 13, further comprising:
generating a third transmission frame comprising a fifth spatial arrangement of pixel values, wherein the third transmission frame comprises the second overlap region.

15. The method of claim 13, further comprising:
finding a first difference between the hybrid frame region and the first overlap region; and
writing the first difference to the second transmission frame.

16. The method of claim 15, further comprising:
finding a second difference between the first difference and the second overlap region; and
writing the second difference to the second transmission frame.

17. The method of claim 13, further comprising:
identifying a motion vector between a first pixel block at the first overlap region and a second pixel block at the second overlap region; and
writing to the second transmission frame a reference to the second pixel block, wherein the reference to the second pixel block comprises position data identifying position of the second pixel block in the second spatial arrangement of pixel values and difference data indicating a difference between the first pixel block and the second pixel block.

18. The method of claim 13, further comprising:
identifying a spatial continuity feature comprising a first pixel block in the first overlap region and a second pixel block in the second overlap region; and
a reference to the second pixel block, wherein the reference to the second pixel block comprises position data identifying position of the second pixel block in the second spatial arrangement of pixel values and difference data indicating a difference between the first pixel block and the second pixel block.

19. The method of claim 13, further comprising:
receiving a first indication of a stitching seam in the hybrid frame region;
receiving a second indication of a first blend limit in the hybrid frame region on a first side of the stitching seam;
receiving a third indication of a second blend limit in the hybrid frame region on a second side of the stitching seam;
determine a first overlap region blend limit at a first position at the first overlap region that is equivalent to a second position of the first blend limit in the hybrid frame region;
identifying a first non-duplicative portion of the first overlap region, wherein the non-duplicative portion of the first overlap region comprises pixel positions of the first spatial arrangement of pixel values from a first edge of the first frame to the first overlap region blend limit;
determining a second overlap region blend limit at a third position at the second overlap region that is equivalent to a fourth position of the second blend limit in the hybrid frame region;
identifying a second non-duplicative portion of the second overlap region, wherein the non-duplicative portion of the second overlap region comprises pixel positions of the second spatial arrangement of pixel values from a second edge of the second frame to the second overlap region blend limit; and writing the non-duplicative portion of the first overlap region to the second transmission frame.

20. The method of claim 13, wherein the first transmission frame is positioned before the second transmission frame according to a transmission frame sequence and wherein the first transmission frame is sent before the second transmission frame is sent.

* * * * *